United States Patent
Lee

(10) Patent No.: US 11,537,515 B2
(45) Date of Patent: Dec. 27, 2022

(54) REORDERING A DESCRIPTOR QUEUE WHILE SEARCHING THE QUEUE OF DESCRIPTORS CORRESPONDING TO MAP SEGMENTS

(71) Applicant: SK hynix Inc., Gyeonggi-do (KR)

(72) Inventor: Joung Young Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 57 days.

(21) Appl. No.: 16/985,790

(22) Filed: Aug. 5, 2020

(65) Prior Publication Data

US 2021/0303464 A1  Sep. 30, 2021

(30) Foreign Application Priority Data

Mar. 25, 2020 (KR) ........................ 10-2020-0035952

(51) Int. Cl.
| G06F 12/06 | (2006.01) |
| G06F 7/24 | (2006.01) |
| G06F 12/02 | (2006.01) |
| G06F 3/06 | (2006.01) |
| G06F 16/28 | (2019.01) |
| G06F 16/35 | (2019.01) |
| G06F 13/16 | (2006.01) |

(52) U.S. Cl.
CPC ........ *G06F 12/0646* (2013.01); *G06F 3/0656* (2013.01); *G06F 3/0679* (2013.01); *G06F 7/24* (2013.01); *G06F 12/0246* (2013.01); *G06F 13/1631* (2013.01); *G06F 16/285* (2019.01); *G06F 16/35* (2019.01); *G06F 2212/1041* (2013.01); *G06F 2212/7201* (2013.01); *G06F 2212/7203* (2013.01)

(58) Field of Classification Search
None
See application file for complete search history.

(56) References Cited

U.S. PATENT DOCUMENTS

| 4,926,321 | A | * | 5/1990 | Sakamura ........... G06F 9/30043 |
| 6,032,207 | A | * | 2/2000 | Wilson ...................... G06F 7/24 |
| | | | | 710/54 |
| 11,042,316 | B1 | * | 6/2021 | Xie ........................ G06F 3/0641 |
| 2004/0205092 | A1 | * | 10/2004 | Longo ................. G06F 12/0871 |
| | | | | 711/111 |

(Continued)

FOREIGN PATENT DOCUMENTS

| KR | 10-2018-0108513 | 10/2018 |
| KR | 10-2019-0078479 | 7/2019 |

*Primary Examiner* — Jared I Rutz
*Assistant Examiner* — Marwan Ayash
(74) *Attorney, Agent, or Firm* — IP & T Group LLP

(57) ABSTRACT

Provided herein may be a memory controller configured to control a memory device. The memory controller may include a map buffer, a descriptor queue, and a descriptor controller. The map buffer may sequentially store map segments of a plurality of map segments stored in the memory device. The descriptor queue may store descriptors corresponding to the respective map segments, based on a plurality of addresses of the map buffer. The descriptor controller may search for a target descriptor among the stored descriptors based on a logical address received from a host, and reorder the stored descriptors while searching for the target descriptor.

19 Claims, 35 Drawing Sheets

(56) References Cited

U.S. PATENT DOCUMENTS

2011/0106804 A1* 5/2011 Keeler .................... G06F 3/068
707/737
2012/0078922 A1* 3/2012 Masser ................ G06F 16/217
707/752

* cited by examiner

| Addr | Descriptor |
|---|---|
| 1 | 7 |
| 2 | 3 |
| 3 | 10 |
| 4 | 13 |
| 5 | 5 |
| 6 | 2 |
| 7 | 1 |
| 8 | 44 |

1st Search

| Addr | Descriptor |
|---|---|
| 1 | 3 |
| 2 | 7 |
| 3 | 10 |
| 4 | 5 |
| 5 | 2 |
| 6 | 13 |
| 7 | 1 |
| 8 | 44 | ical description is provided
REORDERING A DESCRIPTOR QUEUE WHILE SEARCHING THE QUEUE OF DESCRIPTORS CORRESPONDING TO MAP SEGMENTS

CROSS-REFERENCE TO RELATED APPLICATION

The present application claims priority under 35 U.S.C. § 119(a) to Korean patent application number 10-2020-0035952, filed on Mar. 25, 2020, which is incorporated herein by reference in its entirety.

BACKGROUND

1. Field of Invention

Various embodiments of the present disclosure generally relate to an electronic device, and more particularly, to a memory system, a memory controller and a method of operating the memory controller.

2. Description of Related Art

Generally, a storage device stores data under control of a host device such as a computer or a smartphone. The storage device may include a memory device configured to store data, and a memory controller configured to control the memory device. Generally, there are types of memory devices: volatile memory devices and nonvolatile memory devices.

A volatile memory device retains data only when power is supplied thereto; data stored therein is lost when power is turned off. Examples of a volatile memory device include a static random access memory (SRAM), and a dynamic random access memory (DRAM).

A nonvolatile memory device continues to store data even when power is turned off. Examples of a nonvolatile memory device include a read-only memory (ROM), a programmable ROM (PROM), an electrically programmable ROM (EPROM), an electrically erasable programmable ROM (EEPROM), and a flash memory.

SUMMARY

Various embodiments of the present disclosure are directed to a memory controller having improved map search performance, and a method of operating the memory controller.

An embodiment of the present disclosure may provide for a memory controller configured to control a memory device. The memory controller may include: a map buffer, a descriptor queue, and a descriptor controller. The map buffer may sequentially store map segments of a plurality of map segments stored in the memory device. The descriptor queue may store descriptors corresponding to the respective map segments, based on a plurality of addresses of the map buffer. The descriptor controller may search for a target descriptor among the stored descriptors based on a logical address received from a host, and reorder the stored descriptors while searching for the target descriptor.

An embodiment of the present disclosure may provide for a method of operating a memory controller including a map buffer and a descriptor queue. The method may include: sequentially storing map segments loaded from the memory device in the map buffer; storing descriptors corresponding to the respective loaded map segments in the descriptor queue, based on a plurality of addresses of the map buffer; searching for a target descriptor among the stored descriptors based on a logical address received from a host; and reordering the stored descriptors while searching for the target descriptor.

An embodiment of the present disclosure may provide for a memory system. The memory system may include: a memory device, a controller. The controller may include a map buffer and a descriptor queue. The controller may load a plurality of map segments in the map buffer. The controller may store descriptors for the loaded map segments in the descriptor queue. The controller may search for a target descriptor for a logical address from a host, among the stored descriptors. The controller may reorder the stored descriptors in the descriptor queue, based on the search result of the target descriptor, to arrange the descriptors in a set order.

DETAILED DESCRIPTION

Specific structural and functional description is provided only for describing embodiments of the present disclosure. The present invention, however, may be implemented in different forms and ways than described herein. Thus, the present invention is not limited by or to any of the disclosed embodiments. Also, throughout the specification, reference to "an embodiment," "another embodiment" or the like is not necessarily to only one embodiment, and different references to any such phrase are not necessarily to the same embodiment(s).

Figure 1:
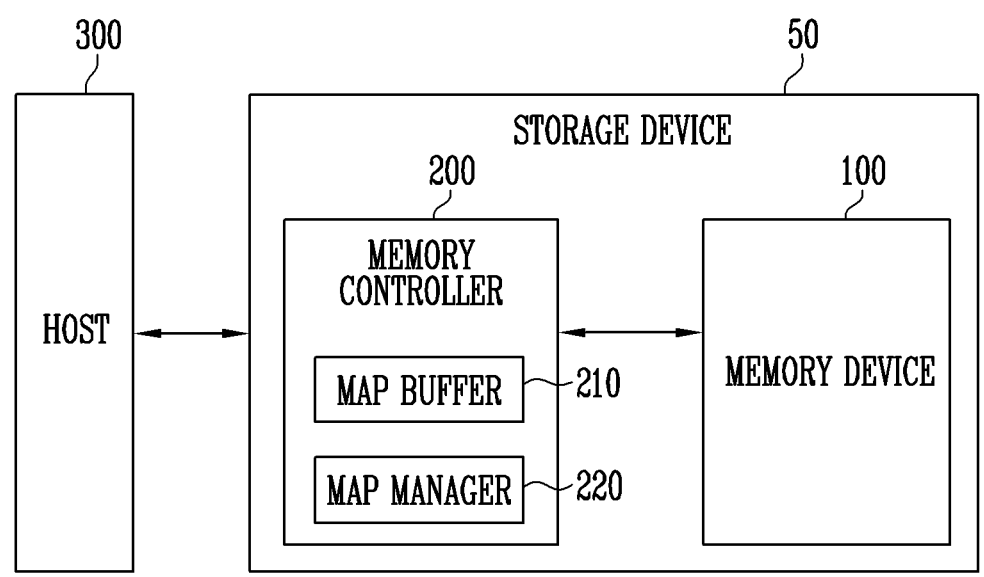
FIG. 1 is a diagram illustrating a storage device in accordance with an embodiment of the present disclosure.

FIG. 1 is a diagram illustrating a storage device 50 in accordance with an embodiment of the present disclosure.

Referring to FIG. 1, the storage device 50 may include a memory device 100 and a memory controller 200 configured to control the operation of the memory device 100. The storage device 50 may store data under control of a host 300 such as a cellular phone, a smartphone, an MP3 player, a laptop computer, a desktop computer, a game machine, a TV, a tablet PC, or an in-vehicle infotainment system.

The storage device 50 may be configured as any of various kinds of storage devices depending on a host interface, which is a communication system for communicating with the host 300. For example, the data storage device 50 may be configured as an SSD, MMC, eMMC, RS-MMC, or micro-MMC type multimedia card, an SD, mini-SD, micro-SD type secure digital card, a universal serial bus (USB) storage device, a universal flash storage (UFS) device, a personal computer memory card international association (PCMCIA) card type storage device, a peripheral component interconnection (PCI) card type storage device, a PCI-express (PCI-e or PCIe) type storage device, a compact flash (CF) card, a smart media card, and/or a memory stick.

The storage device 50 may be manufactured in the form of any of various package types. For instance, the storage device 50 may be manufactured in the form of a package on package (POP) type, a system in package (SIP) type, a system on chip (SOC) type, a multi-chip package (MCP) type, a chip on board (COB) type, a wafer-level fabricated package (WFP) type, and/or a wafer-level stack package (WSP) type.

The memory device 100 may store data therein. The memory device 100 may operate under control of the memory controller 200. The memory device 100 may include a memory cell array including a plurality of memory cells configured to store data therein.

Each memory cell may be a single level cell (SLC) capable of storing a single data bit, a multi-level cell (MLC) capable of storing two data bits, a triple-level cell (TLC) capable of storing three data bits, or a quad-level cell (QLC) capable of storing four data bits. In an embodiment, all memory cells of the memory cell array are of the same level.

The memory cell array may include a plurality of memory blocks. Each memory block may include a plurality of memory cells. Each memory block may include a plurality of pages. In an embodiment, each page may be the unit of sorting data in the memory device 100 or reading stored data from the memory device 100.

Each memory block may be the unit of erasing data. In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory device, a resistive random access memory (RRAM), a phase-change random access memory (PRAM), a magnetoresistive random access memory (MRAM), a ferroelectric random access memory (FRAM), or a spin transfer torque random access memory (STT-RAM). In this specification, aspects and features of the present invention are described in the context in which the memory device 100 is a NAND flash memory.

The memory device 100 may receive a command and an address from the memory controller 200 and access an area of the memory cell array that is selected by the address. In other words, the memory device 100 may perform an operation instructed by the command on the area selected by the address. For example, the memory device 100 may perform a write (or program) operation, a read operation, and an erase operation. During a program operation, the memory device 100 may program data to an area selected by an address. During a read operation, the memory device 100 may read data from an area selected by an address. During an erase operation, the memory device 100 may erase data from an area selected by an address.

In an embodiment, the memory device 100 may store a plurality of map segments including mapping data between logical addresses received from the host 300 and physical addresses of the memory device 100.

The memory controller 200 may control overall operation of the storage device 50.

When power is applied to the storage device 50, the memory controller 200 may execute firmware (FW). In the case where the memory device 100 is a flash memory device, the memory controller 200 may execute firmware such as a flash translation layer (FTL) for controlling communication between the host 300 and the memory device 100.

In an embodiment, the memory controller 200 may receive data and a logical block address (LBA) from the host 300, and translate the LBA into a physical block address (PBA) indicating addresses of memory cells to which data is to be stored, the memory cells being included in the memory device 100.

The memory controller 200 may control the memory device 100 to perform a program operation, a read operation, or an erase operation in response to a request from the host 300. During the program operation, the memory controller 200 may provide a write command, a PBA, and data to the memory device 100. During the read operation, the memory controller 200 may provide a read command and a PBA to the memory device 100. During the erase operation, the memory controller 200 may provide an erase command and a PBA to the memory device 100.

In an embodiment, the memory controller 200 may autonomously generate a command, an address and data in the absence of a request from the host 300, and transmit them to the memory device 100. For example, the memory controller 200 may provide a command, an address and data to the memory device 100 to perform background operations such as a program operation for wear leveling, and a program operation for garbage collection.

In an embodiment, the memory controller 200 may control two or more memory devices 100. In this case, the memory controller 200 may control the memory devices 100 in an interleaving manner so as to enhance the operating performance. The interleaving scheme may be an operating scheme at least two memory devices 100 operate in an overlapping period of time.

In an embodiment, the memory controller 200 may include a map buffer 210 and a map manager 220.

The map buffer 210 may store map segments among the plurality of map segments stored in the memory device 100. The map buffer 210 may include a storage area corresponding to each of a plurality of addresses. The map buffer 210 may store each map segment in the storage area corresponding to each address in a loaded sequence.

The map manager 220 may search for map data corresponding to a logical address received from the host 300 among the plurality of map segments stored in the map buffer 210. The map manager 220 may include a descriptor queue that store descriptors corresponding to the respective map segments based on the plurality of addresses of the map buffer 210. The descriptor queue may store descriptors corresponding to map segments in a sequence in which the map segments are loaded from the memory device 100. The descriptor may be an index indicating a map segment.

The map manager 220 may determine a target descriptor based on a logical address. The target descriptor may be an index indicating a map segment including a logical address. In an embodiment, the target descriptor may be a portion of a logical address value.

The map manager 220 may search for a target descriptor in the descriptor queue. The map manager 220 may read a descriptor corresponding to a selected address among the plurality of addresses in the descriptor queue. The map manager 220 may determine whether the read descriptor matches the target descriptor.

If the read descriptor matches the target descriptor, the map manager 220 may search for a map segment including a logical address received from the host 300 among the map segments stored in the map buffer 210, based on an address of a map buffer corresponding to the read descriptor. The map manager 220 may search for map data corresponding to the logical address in the corresponding map segment.

If the read descriptor differs from the target descriptor, the map manager 220 may change the selected address associated with the target descriptor and search again for a read descriptor that matches the target descriptor. This process may continue until the map manager 220 finds a descriptor that matches the target descriptor or it is determined there is no match. In the latter case, the map manager 220 may load, from the memory device 100, a map segment indicated by the target descriptor among the plurality of map segments stored in the memory device 100.

The map manager 220 may reorder the descriptors stored in the descriptor queue in connection with searching for the target descriptor among the descriptors stored in the descriptor queue. In an embodiment, the map manager 220 may order the descriptors stored in the descriptor queue in an ascending order based on their respective addresses. In another embodiment, the map manager 220 may order the descriptors stored in the descriptor queue in a descending order based on their respective addresses. The order of descriptors is described with reference to FIGS. 5A to 5I and 7A to 7K.

The host 300 may communicate with the storage device 50 using at least one of various communication methods such as universal serial bus (USB), serial AT attachment (SATA), serial attached SCSI (SAS), high speed interchip (HSIC), small computer system interface (SCSI), peripheral component interconnection (PCI), PCI express (PCIe), non-volatile memory express (NVMe), universal flash storage (UFS), secure digital (SD), multimedia card (MMC), embedded MMC (eMMC), dual in-line memory module (DIMM), registered DIMM (RDIMM), and/or load reduced DIMM (LRDIMM) communication methods.

Figure 2:
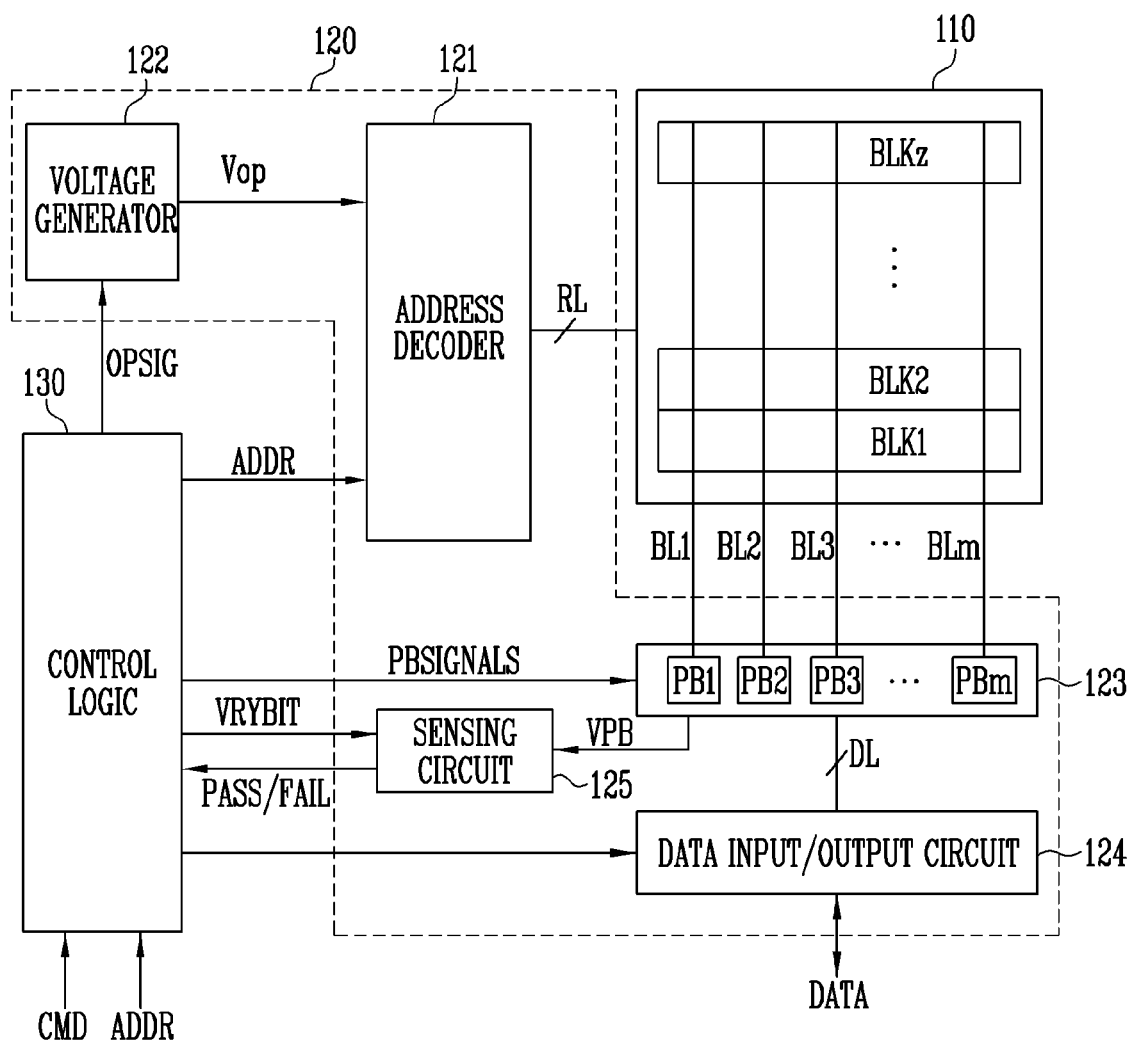
FIG. 2 is a diagram illustrating a configuration of a memory device, such as that of FIG. 1.

FIG. 2 is a diagram illustrating a configuration of the memory device 100 of FIG. 1.

Referring to FIG. 2, the memory device 100 may include a memory cell array 110, a peripheral circuit 120, and control logic 130. The peripheral circuit 120 may include an address decoder 121, a voltage generator 122, a read/write circuit 123, a data input/output circuit 124, and a sensing circuit 125.

The memory cell array 110 may include a plurality of memory blocks BLK1 to BLKz. The plurality of memory blocks BLK1 to BLKz are coupled to the address decoder 121 through row lines RL. The memory blocks BLK1 to BLKz may be coupled to the read/write circuit 123 through bit lines BL1 to BLm. Each of the memory blocks BLK1 to BLKz may include a plurality of memory cells. In an embodiment, the plurality of memory cells may be nonvolatile memory cells. Memory cells coupled to the same word line among the plurality of memory cells are defined as one page. In other words, the memory cell array 110 may be formed of a plurality of physical pages. In an embodiment, each of the memory blocks BLK1 to BLKz in the memory cell array 110 may include a plurality of dummy cells. One or more dummy cells may be coupled in series between a drain select transistor and memory cells and between a source select transistor and the memory cells.

Each of the memory cells of the memory device 100 may be formed of a single level cell (SLC) capable of storing a single data bit, a multi-level cell (MLC) capable of storing two data bits, a triple-level cell (TLC) capable of storing three data bits, or a quad-level cell (QLC) capable of storing four data bits.

The peripheral circuit 120 may drive the memory cell array 110. For example, the peripheral circuit 120 may drive the memory cell array 110 to perform a program operation, a read operation, or an erase operation.

The address decoder 121 is coupled to the memory cell array 110 through the row lines RL. The row lines RL may include drain select lines, word lines, source select lines, and a common source line. In an embodiment, the word lines may include normal word lines and dummy word lines. In an embodiment, the row lines RL may further include a pipe select line.

The address decoder 121 may operate under control of the control logic 130. The address decoder 121 may receive addresses ADDR from the control logic 130.

The address decoder 121 may decode a block address among the received addresses ADDR. The address decoder 121 may select at least one of the memory blocks BLK1 to BLKz according to the decoded block address. The address decoder 121 may decode a row address among the received addresses ADDR. The address decoder 121 may select at least one of the word lines of the selected memory block according to the decoded row address. The address decoder 121 may apply, to the selected word line, an operating voltage Vop supplied with the voltage generator 122.

During a program operation, the address decoder 121 may apply a program voltage to a selected word line and apply a pass voltage lower than that of the program voltage to unselected word lines. During a program verify operation, the address decoder 121 may apply a verify voltage to a selected word line and apply a verify pass voltage higher than that of the verify voltage to unselected word lines.

During a read operation, the address decoder 121 may apply a read voltage to a selected word line and apply a read pass voltage higher than that of the read voltage to unselected word lines.

In an embodiment, an erase operation of the memory device 100 may be performed on a memory block basis. During the erase operation, an address ADDR to be input to the memory device 100 includes a block address. The address decoder 121 may decode the block address and select at least one memory block according to the decoded block address. During the erase operation, the address decoder 121 may apply a ground voltage to word lines coupled to the selected memory block.

In an embodiment of the present disclosure, the address decoder 121 may decode a column address among the transmitted addresses ADDR. The decoded column address may be transmitted to the read/write circuit 123. For example, the address decoder 121 may include components such as a row decoder, a column decoder, and an address buffer.

The voltage generator 122 may generate a plurality of operating voltages Vop using an external supply voltage supplied to the memory device 100. The voltage generator 122 may operate under control of the control logic 130.

In an embodiment, the voltage generator 122 may generate an internal supply voltage by regulating the external supply voltage. The internal supply voltage generated from the voltage generator 122 may be used as an operating voltage of the memory device 100.

In an embodiment, the voltage generator 122 may generate a plurality of operating voltages Vop using an external supply voltage or an internal supply voltage. The voltage generator 122 may generate various voltages required from the memory device 100. For example, the voltage generator 122 may generate a plurality of erase voltages, a plurality of program voltages, a plurality of pass voltages, a plurality of select read voltages, and a plurality of unselect read voltages.

The voltage generator 122 may include, so as to generate a plurality of operating voltages Vop having various voltage levels, a plurality of pumping capacitors configured to receive an internal supply voltage. The voltage generator 122 may generate a plurality of operating voltages Vop by selectively enabling the plurality of pumping capacitors under control of the control logic 130.

The generated operating voltages Vop may be supplied to the memory cell array 110 by the address decoder 121.

The read/write circuit 123 may include first to m-th page buffers PB1 to PBm. The first to m-th page buffers PB1 to PBm may be coupled to the memory cell array 110 through the first to m-th bit lines BL1 to BLm, respectively. The first to m-th page buffers PB1 to PBm may operate under control of the control logic 130.

The first to m-th page buffers PB1 to PBm may communicate data DATA with the data input/output circuit 124. During a program operation, the first to m-th page buffers PB1 to PBm may receive data DATA to be stored through the data input/output circuit 124 and data lines DL.

During a program operation, the first to m-th page buffers PB1 to PBm may transmit the data DATA, received through the data input/output circuit 124, to selected memory cells through the bit lines BL1 to BLm when a program voltage is applied to a selected word line. The memory cells in the selected page are programmed based on the transmitted data DATA. Memory cells coupled to a bit line to which a program enable voltage (e.g., a ground voltage) is applied may have increased threshold voltages. Threshold voltages of memory cells coupled to a bit line to which a program inhibit voltage (for example, a supply voltage) is applied may be retained. During a program verify operation, the first to m-th page buffers PB1 to PBm may read data DATA from selected memory cells through the bit lines BL1 to BLm.

During a read operation, the read/write circuit 123 may read data DATA from the memory cells of the selected page through the bit lines BL, and store the read data DATA in the first to m-th page buffers PB1 to PBm.

During an erase operation, the read/write circuit 123 may float the bit lines BL. In an embodiment, the read/write circuit 123 may include a column select circuit.

The data input/output circuit 124 is coupled to the first to m-th page buffers PB1 to PBm through the data lines DL. The data input/output circuit 124 may operate under control of the control logic 130.

The data input/output circuit 124 may include a plurality of input/output buffers (not shown) for receiving input data DATA. During a program operation, the data input/output circuit 124 may receive data DATA to be stored from an external controller (e.g., the controller 200 of FIG. 1). During a read operation, the data input/output circuit 124 may output, to the external controller, the data DATA received from the first to m-th page buffers PB1 to PBm in the read/write circuit 123.

During a read operation or a verify operation, the sensing circuit 125 may generate reference current in response to an enable bit signal VRYBIT generated by the control logic 130, compare a sensing voltage VPB received from the read/write circuit 123 with a reference voltage generated by the reference current, and output a pass signal or a fail signal to the control logic 130.

The control logic 130 may be coupled to the address decoder 121, the voltage generator 122, the read/write circuit 123, the data input/output circuit 124, and the sensing circuit 125. The control logic 130 may control overall operation of the memory device 100. The control logic 130 may operate in response to a command CMD transmitted from an external device.

The control circuit 130 may generate various signals in response to the command CMD and the address ADD and control the peripheral circuit 120. For example, in response to the command CMD and the address ADDR, the control logic 130 may generate an operating signal OPSIG, an address ADDR, a read/write circuit control signal PBSIGNALS, and an enable bit VRYBIT. The control logic 130 may output the operating signal OPSIG to the voltage generator 122, output the address ADDR to the address decoder 121, output the read/write control signal to the read/write circuit 123, and output the enable bit VRYBIT to the sensing circuit 125. The control logic 130 may determine whether target memory cells have passed or failed a verification during the verify operation in response to a pass signal PASS or a fail signal FAIL that is output from the sensing circuit 125.

Figure 3:
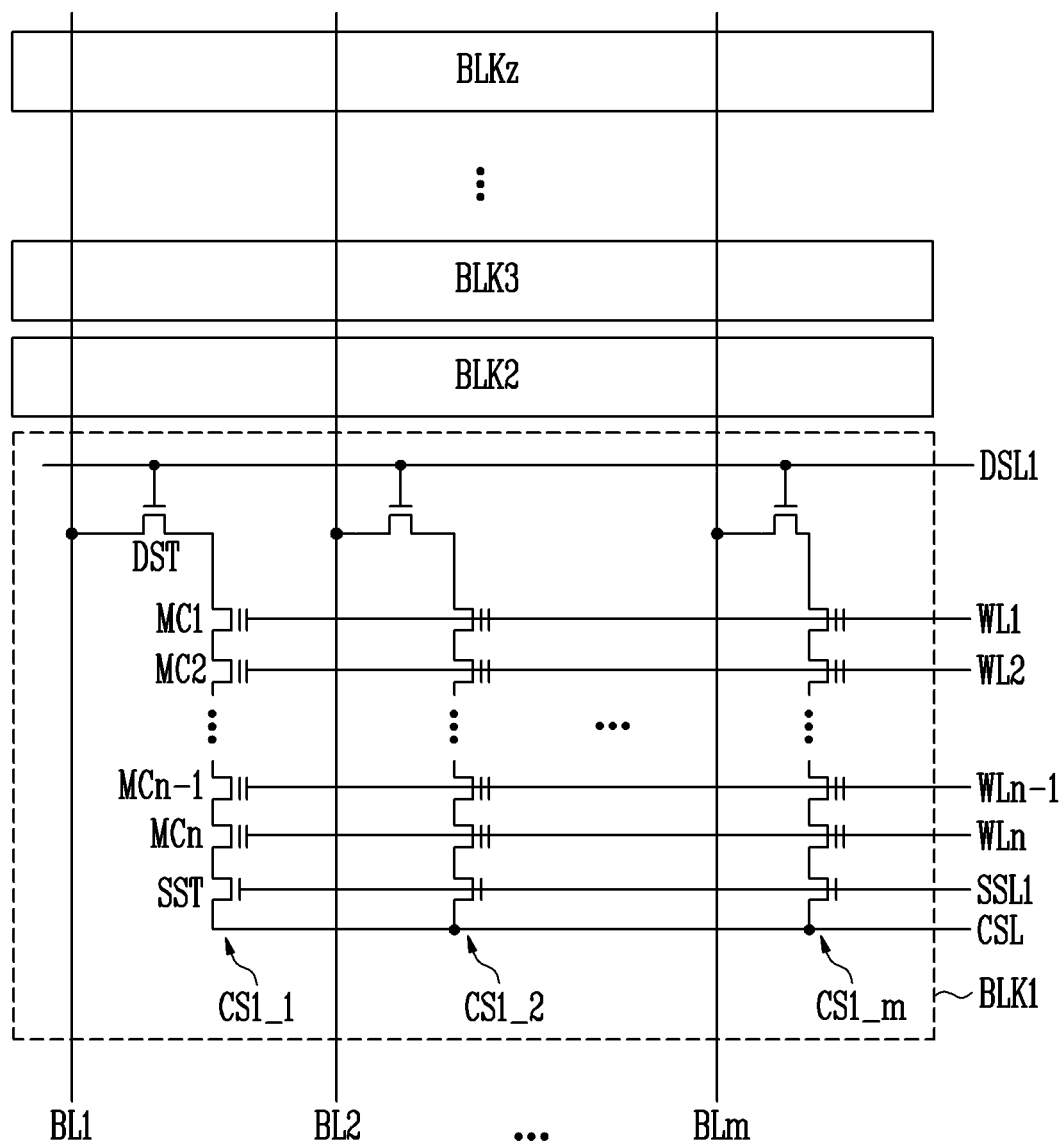
FIG. 3 is a diagram illustrating a memory cell array, such as that of FIG. 2.

FIG. 3 is a diagram illustrating a memory cell array 110 of FIG. 2.

Referring to FIG. 3, the first to z-th memory blocks BLK1 to BLKz of the memory cell array 110 are connected in common to the first to m-th bit lines BL1 to BLm. In FIG. 3, for clarity, elements of only the first memory block BLK1 among the plurality of memory blocks BLK1 to BLKz are illustrated. It may be understood that each of the memory blocks BLK2 to BLKz has the same configuration as that of the first memory block BLK1.

The memory block BLK1 may include a plurality of cell strings CS1_1 to CS1_m (where m is a positive integer). The first to m-th cell strings CS1_1 to CS1_m are respectively coupled to the first to nn-th bit lines BL1 to BLnn. Each of the first to nn-th cell strings CS1_1 to CS1_m includes a drain select transistor DST, a plurality of memory cells MC1 to MCn (where n is a positive integer) coupled in series to each other, and a source select transistor SST.

A gate terminal of the drain select transistor DST in each of the first to nn-th cell strings CS1_1 to CS1_m is coupled to a drain select line DSL1. Gate terminals of the first to n-th memory cells MC1 to MCn in each of the first to nn-th cell strings CS1_1 to CS1_m are respectively coupled to the first to n-th word lines WL1 to WLn. A gate terminal of the source select transistor SST in each of the first to nn-th cell strings CS1_1 to CS1_m is coupled to a source select line SSL1.

The configuration of each cell string will be described based on the first cell string CS1_1 of the plurality of cell strings CS1_1 to CS1_m. It will be understood that each of the other cell strings CS1_1 to CS1_m has the same configuration as that of the first cell string CS1_1.

A drain terminal of the drain select transistor DST in the first cell string CS1_1 is coupled to the first bit line BL1. A source terminal of the drain select transistor DST in the first cell string CS1_1 is coupled to a drain terminal of the first memory cell MC1 in the first cell string CS1_1. The first to n-th memory cells MC1 to MCn are coupled in series to each other. A drain terminal of the source select transistor SST in the first cell string CS1_1 is coupled to a source terminal of the n-th memory cell MCn in the first cell string CS1_1. A source terminal of the source select transistor SST in the first cell string CS1_1 is coupled to a common source line CSL. In an embodiment, the common source line CSL may be coupled in common to the first to z-th memory blocks BLK1 to BLKz.

The drain select line DSL1, the first to n-th word lines WL1 to WLn, and the source select line SSL1 are included in the row lines RL of FIG. 2. The drain select line DSL1, the first to n-th word lines WL1 to WLn, and the source select line SSL1 are controlled by the address decoder 121. The common source line CSL is controlled by the control logic 130. The first to m-th bit lines BL1 to BLm are controlled by the read/write circuit 123.

Figure 4:
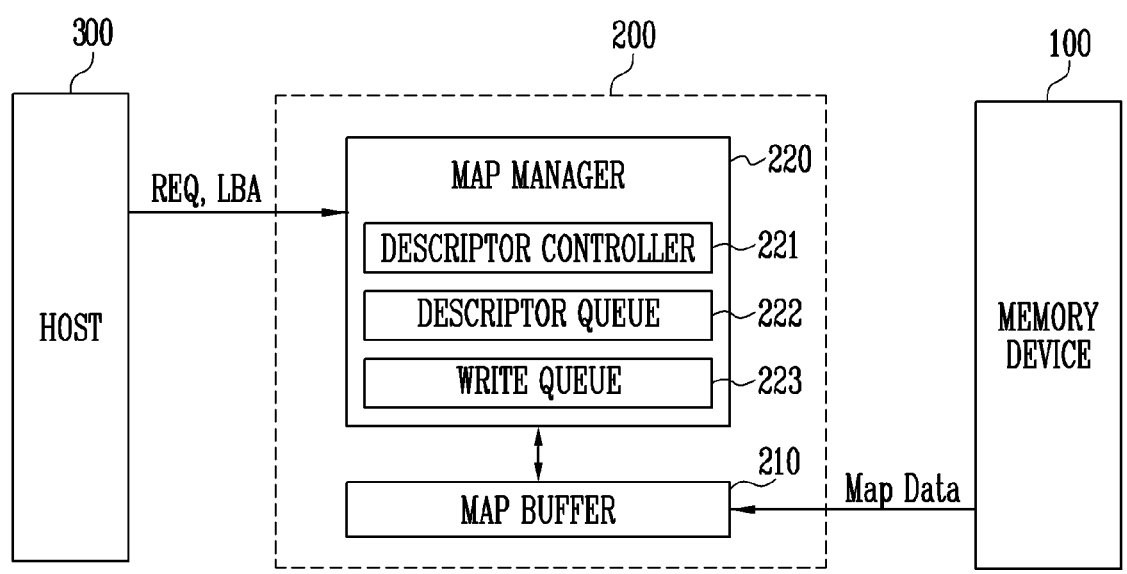
FIG. 4 is a diagram illustrating configuration and operation of a memory controller, such as that of FIG. 1.

FIG. 4 is a diagram illustrating configuration and operation of the memory controller 200 of FIG. 1.

Referring to FIG. 4, the memory device 100 may store a plurality of map segments including mapping data between logical addresses received from the host 300 and physical addresses of the memory device 100.

In an embodiment, the memory controller 200 may include a map buffer 210 and a map manager 220.

The map buffer 210 may store map data loaded from the memory device 100. The map data may include at least one map segment of the plurality of map segments stored in the memory device 100.

The map buffer 210 may include a storage area corresponding to each of a plurality of addresses. The map buffer 210 may store at least one map segment received from the memory device 100 in the storage area corresponding to each address in a loaded sequence.

The map manager 220 may receive a read request REQ and a logical address LBA from the host 300. The map manager 220 may search for map data corresponding to the logical address LBA in response to the read request REQ.

In an embodiment, the map manager 220 may include a descriptor controller 221, a descriptor queue 222, and a write queue 223.

The descriptor queue 222 may include descriptors corresponding to the respective map segments based on the plurality of addresses of the map buffer 210. The descriptor queue 222 may store descriptors corresponding to map segments in a sequence in which the map segments are loaded from the memory device 100. The descriptor may be an index indicating a map segment.

The descriptor controller 221 may search for a target descriptor indicating a map segment including a logical address LBA in the descriptor queue 222.

The descriptor controller 221 may determine a target descriptor based on a logical address LBA. The target descriptor may be an index indicating a map segment including a logical address LBA. In an embodiment, the target descriptor may be a portion of an LBA value.

The descriptor controller 221 may read a descriptor corresponding to a selected address of the plurality of addresses in the descriptor queue 222. The descriptor controller 221 may determine whether the read descriptor matches, i.e., is the same as, the target descriptor.

If the read descriptor matches the target descriptor, the descriptor controller 221 may output matching success information and an address of the map buffer 210 that corresponds to the read descriptor. The map manager 220 may search for a map segment including the logical address LBA received from the host 300 among the map segments stored in the map buffer 210 based on the output address, in response to the matching success information. The map manager 220 may search for map data corresponding to the logical address LBA in the corresponding map segment.

If the read descriptor differs from the target descriptor, the descriptor controller 221 may change the selected address and search for the target descriptor again. This process may continue until a match is found or it is determined there is no match. In the latter case, the descriptor controller 221 may output matching failure information indicating there is no target descriptor in the descriptor queue 222. In response to the matching failure information, the map manager 220 may load, from the memory device 100, a map segment indicated by the target descriptor among the plurality of map segments stored in the memory device 100 based on the logical address LBA.

The descriptor controller 221 may reorder the descriptors stored in the descriptor queue 222 in connection with searching for the target descriptor among the descriptors stored in the descriptor queue 222. In an embodiment, the descriptor controller 221 may order the descriptors stored in the descriptor queue 222 in an ascending order based on their respective addresses in the map buffer 210. In another embodiment, the descriptor controller 221 may order the descriptors stored in the descriptor queue 222 in a descending order based on their respective addresses in the map buffer 210.

In the description that follows, it is assumed that the descriptor controller 221 orders the descriptors stored in the descriptor queue 222 in an ascending order based on the plurality of addresses.

The descriptor controller 221 may determine a searching direction in which the target descriptor is searched for, based on a result of the comparison between the target descriptor and a reference descriptor. If the target descriptor is greater than the reference descriptor, the descriptor controller 221 may determine that the searching direction is a direction in which the plurality of addresses becoming lower (reverse direction). If the target descriptor is less than the reference descriptor, the descriptor controller 221 may determine that the searching direction is a direction in which the plurality of addresses become higher (forward direction). The reference descriptor may be determined as an average value or a median value among descriptors corresponding to the respective map segments stored in the memory device 100. In an embodiment, the reference descriptor may be determined to be any of various values depending on a map search policy of the memory controller.

The write queue 223 may store descriptor information for reordering the descriptors stored in the descriptor queue 222.

The descriptor controller 221 may set a minimum value or a maximum value of one or more descriptors read from the descriptor queue 222 to a pop-up descriptor. The pop-up descriptor may be a descriptor temporarily stored in the descriptor controller 221 for comparison with the read descriptor.

In an embodiment, when searching for a target descriptor in the descriptor queue 222 in the forward direction, the descriptor controller 221 may set the maximum value of the one or more descriptors read from the descriptor queue 222 to the pop-up descriptor. In an embodiment, when searching for a target descriptor in the descriptor queue 222 in the reverse direction, the descriptor controller 221 may set the minimum value of the one or more descriptors read from the descriptor queue 222 to the pop-up descriptor.

The descriptor controller 221 may read a descriptor corresponding to a selected address among the plurality of addresses. The descriptor controller 221 may determine whether the read descriptor matches the target descriptor.

If the read descriptor differs from the target descriptor, the descriptor controller 221 may compare the read descriptor with the pop-up descriptor.

The descriptor controller 221 may store, in the write queue 223, descriptor information including a previous address and the read descriptor of the selected address based on a result of the comparison between the read descriptor and the pop-up descriptor. The descriptor controller 221 may update a descriptor corresponding to the selected address in the descriptor queue 222 to the pop-up descriptor. In the case where the write queue 323 is full, the descriptor controller 221 may not update the descriptor queue 222.

The descriptor controller 221 may update the descriptor queue 222 based on the descriptor information previously stored in the write queue 223 depending on the result of the comparison between the read descriptor and the pop-up descriptor.

In an embodiment, in the case where a searching operation is performed in the forward direction, the descriptor controller 221 may store, if the pop-up descriptor is greater than the read descriptor, descriptor information including a previous address and a read descriptor of a selected address in the write queue 223 based on a result of the comparison between the read descriptor and the pop-up descriptor. Further, the descriptor controller 221 may update a descriptor corresponding to the selected address in the descriptor queue 222 to the pop-up descriptor.

In an embodiment, when the searching operation is performed in the forward direction, the descriptor controller 221 may update, if the pop-up descriptor is less than the read descriptor, the descriptor queue 222 based on the descriptor information previously stored in the write queue 223. The descriptor controller 221 may update the pop-up descriptor to the read descriptor.

The operation of reordering the descriptors stored in the descriptor queue 222 when the searching operation is performed in the forward direction is described with reference to FIGS. 5A to 5I.

In an embodiment, in the case where a searching operation is performed in the reverse direction, the descriptor controller 221 may store, if the pop-up descriptor is less than the read descriptor, descriptor information including a previous address and a read descriptor of a selected address in the write queue 223 based on a result of the comparison between the read descriptor and the pop-up descriptor. Further, the descriptor controller 221 may update a descriptor corresponding to the selected address in the descriptor queue 222 to the pop-up descriptor.

In an embodiment, when the searching operation is performed in the reverse direction, the descriptor controller 221 may update, if the pop-up descriptor is greater than the read descriptor, the descriptor queue 222 based on the descriptor information previously stored in the write queue 223. The descriptor controller 221 may update the pop-up descriptor to the read descriptor.

The operation of reordering the descriptors stored in the descriptor queue 222 when the searching operation is performed in the reverse direction is described with reference to FIGS. 7A to 7K.

FIGS. 5A to 5I are diagrams illustrating a forward map searching operation and a descriptor reordering operation in accordance with an embodiment.

Figure 5A:
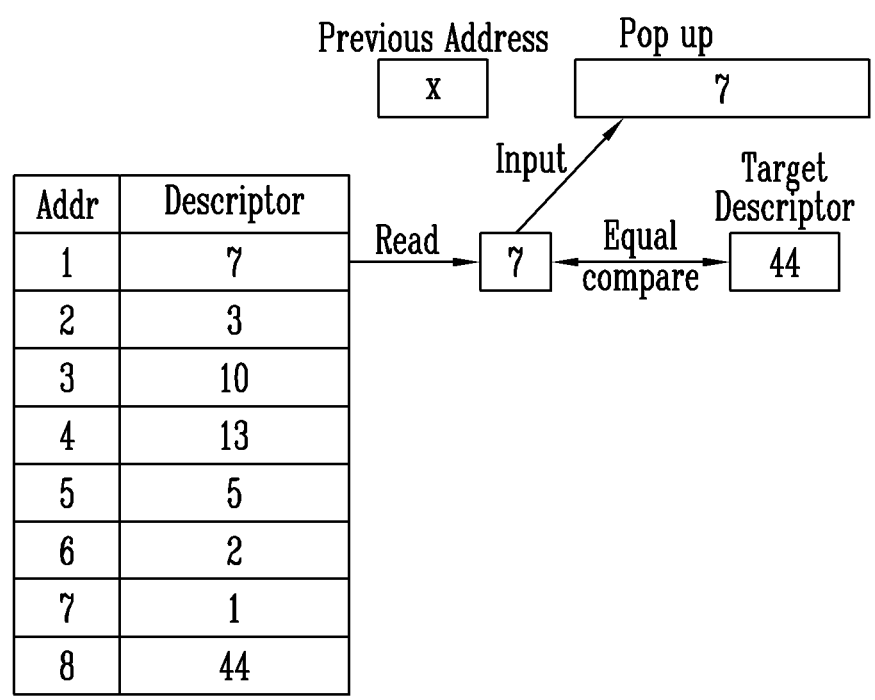
FIGS. 5A to 5I are diagrams illustrating a forward map searching operation and a descriptor reordering operation in accordance with an embodiment.

Referring to FIG. 5A, the descriptor queue may store, based on a plurality of addresses Addr1 to Addr8 of a map buffer 210, descriptors corresponding to respective map segments stored in the map buffer 210. The descriptor may be an index indicating a map segment. The descriptor queue may store descriptors corresponding to the respective map segments in a sequence in which the map segments are loaded from the memory device 100.

The target descriptor may be an index indicating a map segment including a logical address received from the host 300. The target descriptor may be determined based on the logical address. In an embodiment, the target descriptor may be a partial value of the logical address.

In the description with reference to FIGS. 5A to 5I, it is assumed that the logical address is 04405. Upper three bits of the logical address may be used as a target descriptor, and lower two bits of the logical address may be used as an offset. A method of determining the value and descriptor of the logical address is not limited to embodiments of the present disclosure.

The target descriptor that indicates a map segment including the logical address may be 44. The memory controller 200 may search for the target descriptor in the descriptor queue and obtain an address of a map buffer corresponding to the target descriptor. The memory controller 200 may obtain a map segment which is indicated by target descriptor 44 from the map buffer 210 based on the address. The memory controller 200 may obtain map data corresponding to logical address 04405 with reference to map data having an offset of 5 in the obtained map segment.

The searching direction may be determined depending on a result of the comparison between the target descriptor and the reference descriptor. If the target descriptor is greater than the reference descriptor, the searching direction may be determined to be the reverse direction. If the target descriptor is less than the reference descriptor, the searching direction may be determined to be the forward direction. In the description with reference to FIGS. 5A to 5I, it is assumed that the reference descriptor is 50. In FIGS. 5A to 5I, since target descriptor 44 is less than reference descriptor 50, the target descriptor may be searched for in the forward direction.

In an embodiment, the descriptor queue may store descriptors 7, 3, 10, 13, 5, 2, 1, and 44 corresponding to addresses Addr1 to Addr8, respectively. The number of addresses is not limited to that of the present embodiment.

Referring to FIG. 5A, since the searching direction is the forward direction, a first address Addr1 of the plurality of addresses Addr1 to Addr8 may be determined to be a selected address. Descriptor 7 corresponding to the selected address may be read. It may be determined whether read descriptor 7 matches target descriptor 44. Since read descriptor 7 does not match target descriptor 44, the operation of searching for the target descriptor may be performed in a direction in which the selected address increases.

The pop-up descriptor may be determined based on the maximum value of one or more descriptors read from the descriptor queue. Since read descriptor 7 is the maximum value of the one or more descriptors read from the descriptor queue, read descriptor 7 may be set to the pop-up descriptor.

Figure 5B:
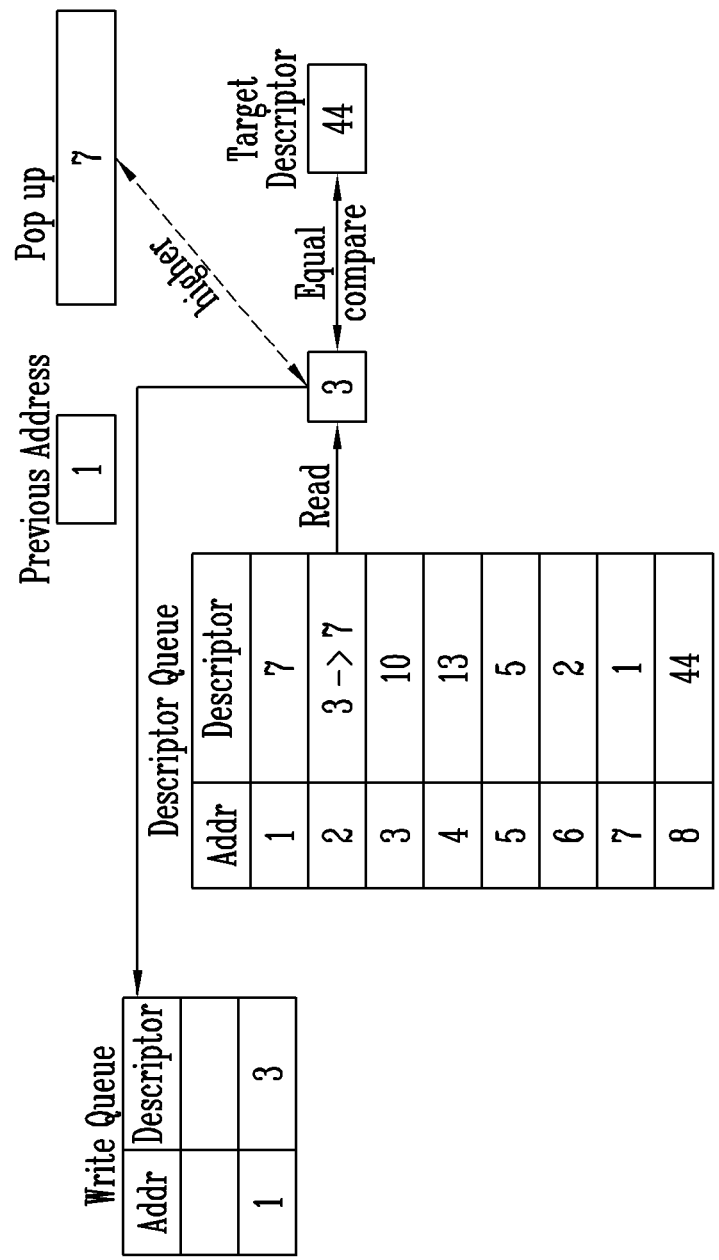

Referring to FIG. 5B, the selected address may be increased from the first address to a second address. The previous address may be the first address. Descriptor 3 corresponding to the selected address may be read. It may be determined whether read descriptor 3 matches target descriptor 44. Since read descriptor 3 does not match target descriptor 44, the operation of searching for the target descriptor may be performed in a direction in which the selected address increases.

Since read descriptor 3 does not match target descriptor 44, read descriptor 3 may be compared with pop-up descriptor 7. Since pop-up descriptor 7 is greater than read descriptor 3, descriptor information including read descriptor 3 and the first address that is the previous address may be stored in the write queue. Descriptor 3 corresponding to the second address that is the selected address in the descriptor queue may be updated to 7 that is the pop-up descriptor.

Figure 5C:
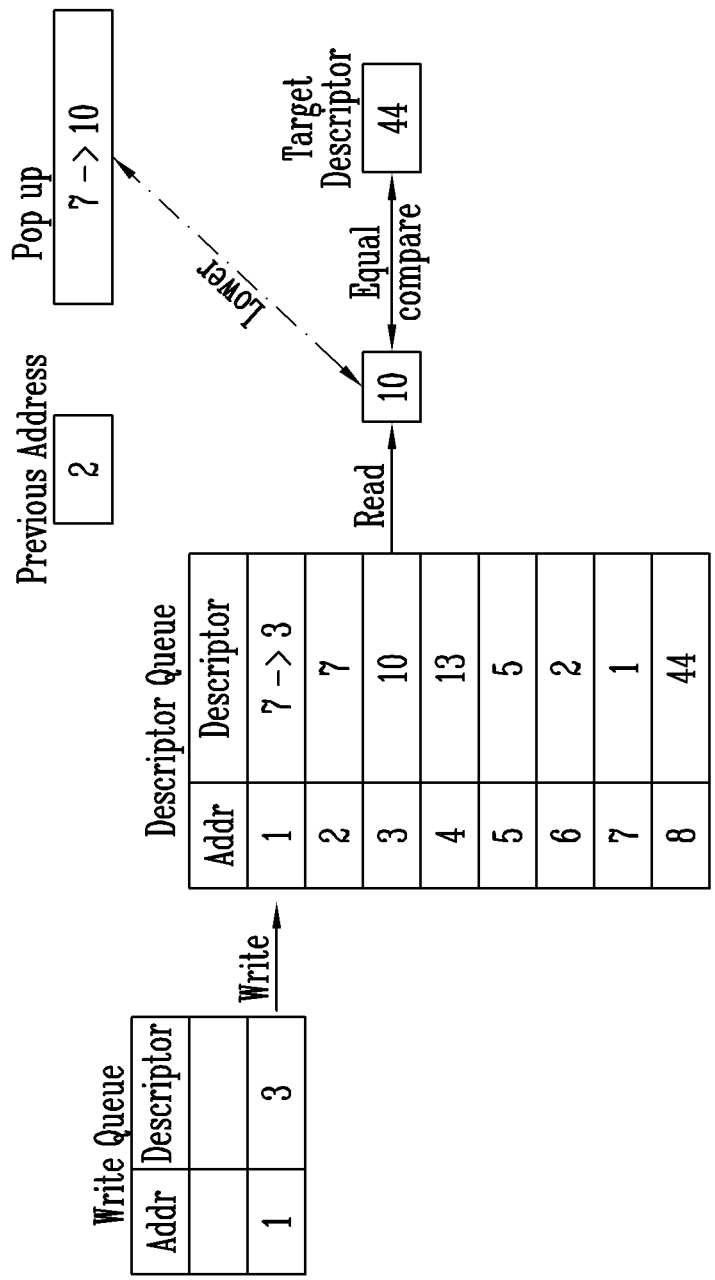

Referring to FIG. 5C, the selected address may be increased from the second address to a third address. The previous address may be the second address. Descriptor 10 corresponding to the selected address may be read. It may be determined whether read descriptor 10 matches target descriptor 44. Since read descriptor 10 does not match target descriptor 44, the operation of searching for the target descriptor may be performed in a direction in which the selected address increases.

Since read descriptor 10 does not match target descriptor 44, read descriptor 10 may be compared with pop-up descriptor 7. Since pop-up descriptor 7 is less than read descriptor 10, the descriptor queue may be updated based on the descriptor information stored in the write queue. Therefore, descriptor 7 corresponding to the first address in the descriptor queue may be updated to descriptor 3.

The pop-up descriptor may be determined to be the maximum value of one or more descriptors read from the descriptor queue. Therefore, since pop-up descriptor 7 is less than read descriptor 10, pop-up descriptor 7 may be updated to read descriptor 10.

Figure 5D:
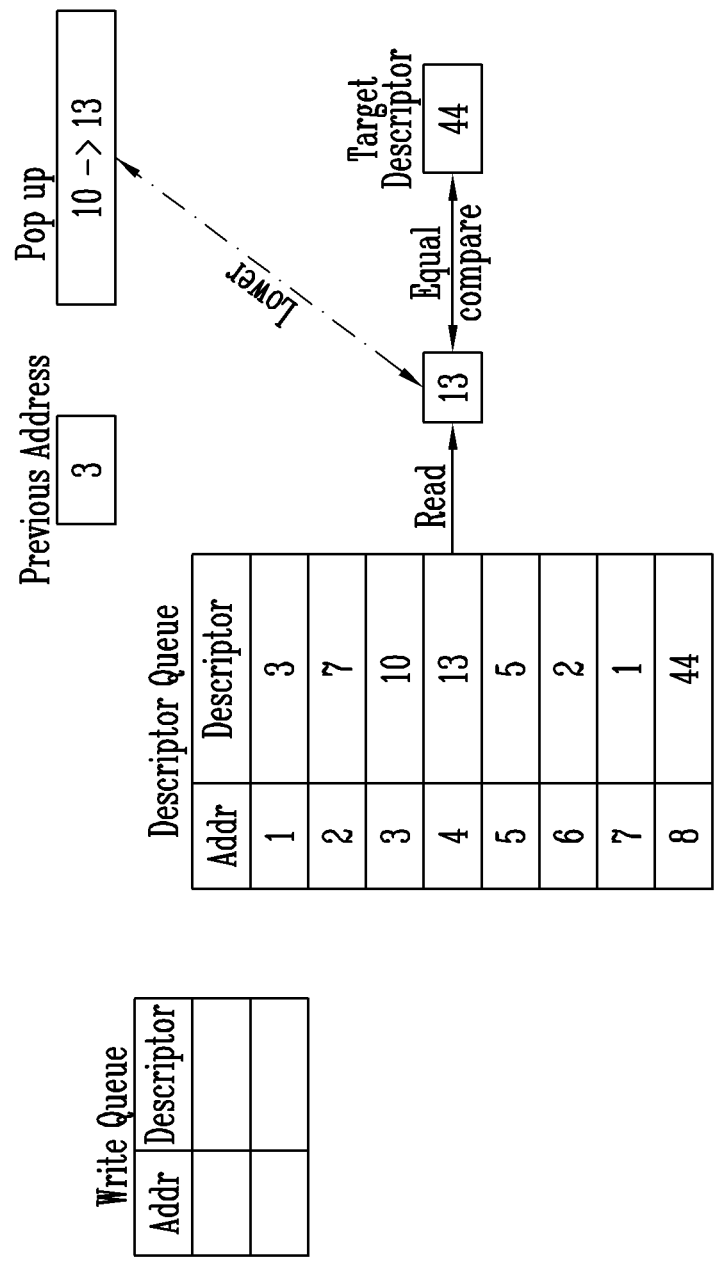

Referring to FIG. 5D, the selected address may be increased from the third address to a fourth address. The previous address may be the third address. Descriptor 13 corresponding to the selected address may be read. It may be determined whether read descriptor 13 matches target descriptor 44. Since read descriptor 13 does not match target descriptor 44, the operation of searching for the target descriptor may be performed in a direction in which the selected address increases.

Since read descriptor 13 does not match target descriptor 44, read descriptor 13 may be compared with pop-up descriptor 10. Since pop-up descriptor 10 is less than read descriptor 13, pop-up descriptor 10 may be updated to read descriptor 13.

Figure 5E:
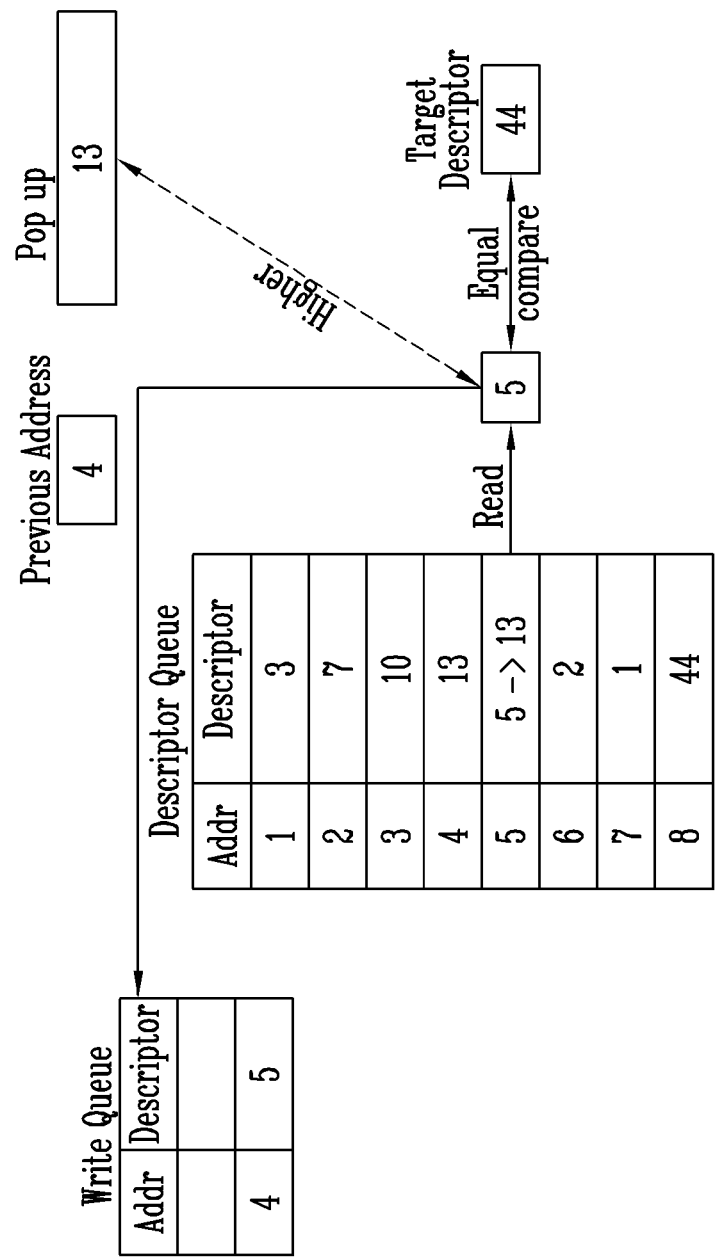

Referring to FIG. 5E, the selected address may be increased from the fourth address to a fifth address. The previous address may be the fourth address. Descriptor 5 corresponding to the selected address may be read. It may be determined whether read descriptor 5 matches target descriptor 44. Since read descriptor 5 does not match target descriptor 44, the operation of searching for the target descriptor may be performed in a direction in which the selected address increases.

Since read descriptor 5 does not match target descriptor 44, read descriptor 5 may be compared with pop-up descriptor 13. Since pop-up descriptor 13 is greater than read descriptor 5, descriptor information including read descriptor 5 and the fourth address that is the previous address may be stored in the write queue. Descriptor 5 corresponding to the fifth address that is the selected address in the descriptor queue may be updated to 13 that is the pop-up descriptor.

Figure 5F:
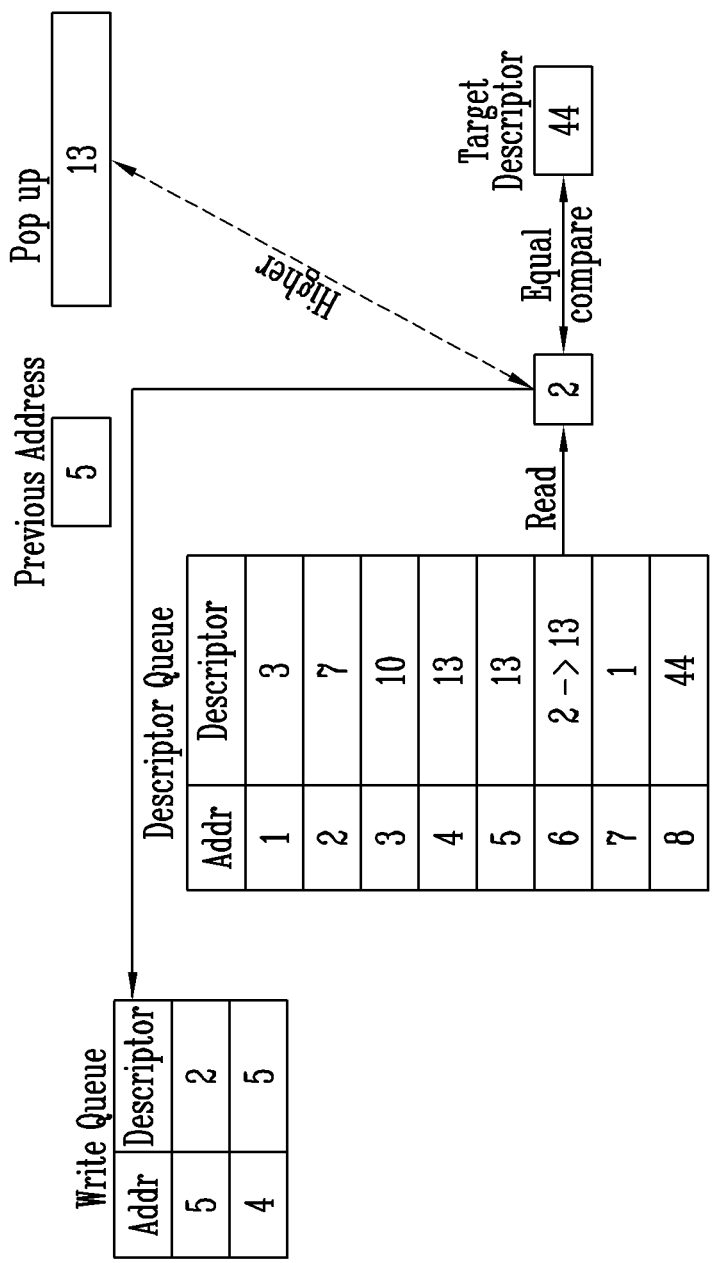

Referring to FIG. 5F, the selected address may be increased from the fifth address to a sixth address. The previous address may be the fifth address. Descriptor 2 corresponding to the selected address may be read. It may be determined whether read descriptor 2 matches target descriptor 44. Since read descriptor 2 does not match target descriptor 44, the operation of searching for the target descriptor may be performed in a direction in which the selected address increases.

Since read descriptor 2 does not match target descriptor 44, read descriptor 2 may be compared with pop-up descriptor 13. Since pop-up descriptor 13 is greater than read descriptor 2, descriptor information including read descriptor 2 and the fifth address that is the previous address may be stored in the write queue. Descriptor 2 corresponding to the sixth address that is the selected address in the descriptor queue may be updated to 13 that is the pop-up descriptor.

Figure 5G:
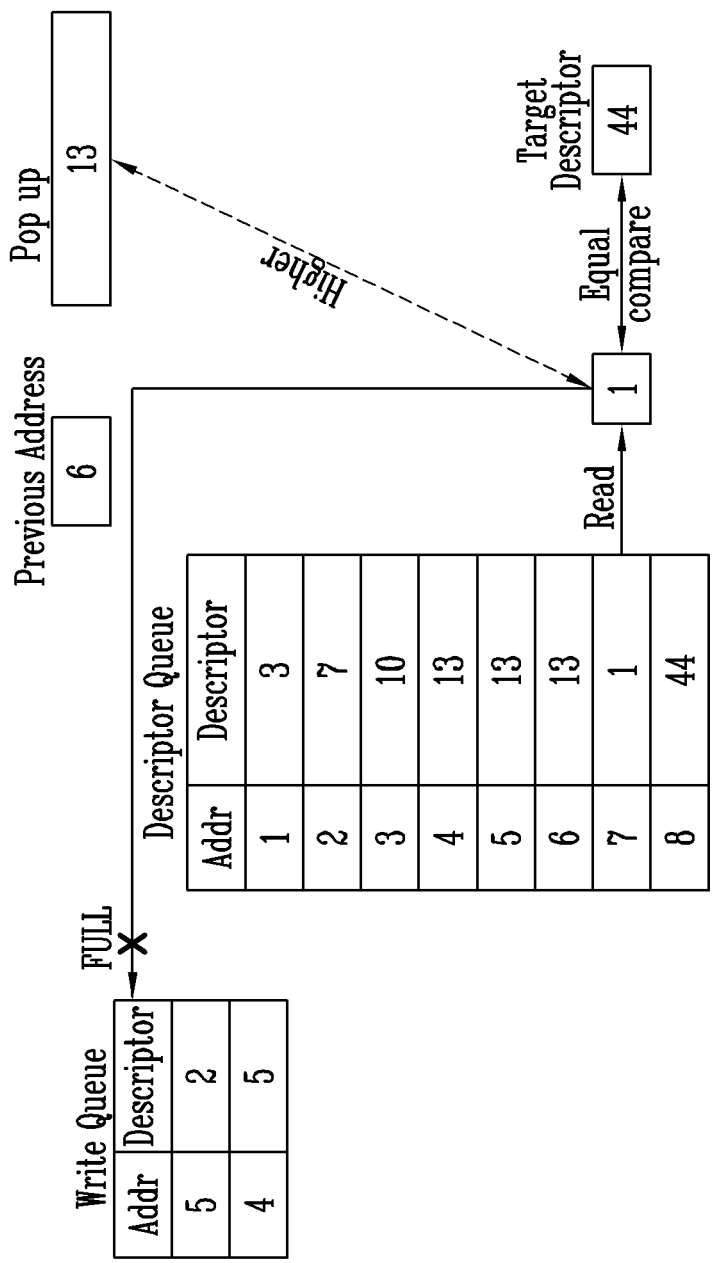

Referring to FIG. 5G, the selected address may be increased from the sixth address to a seventh address. The previous address may be the sixth address. Descriptor 1 corresponding to the selected address may be read. It may be determined whether read descriptor 1 matches target descriptor 44. Since read descriptor 1 does not match target descriptor 44, the operation of searching for the target descriptor may be performed in a direction in which the selected address increases.

Since read descriptor 1 does not match target descriptor 44, read descriptor 1 may be compared with pop-up descriptor 13. Since pop-up descriptor 13 is greater than read descriptor 1, descriptor information including read descriptor 1 and the sixth address that is the previous address is required to be stored in the write queue. However, because the write queue is full, the descriptor information may not be stored in the write queue. Therefore, descriptor 1 corresponding to the seventh address that the selected address in the descriptor queue may not be updated to 13 that is the pop-up descriptor.

Figure 5H:
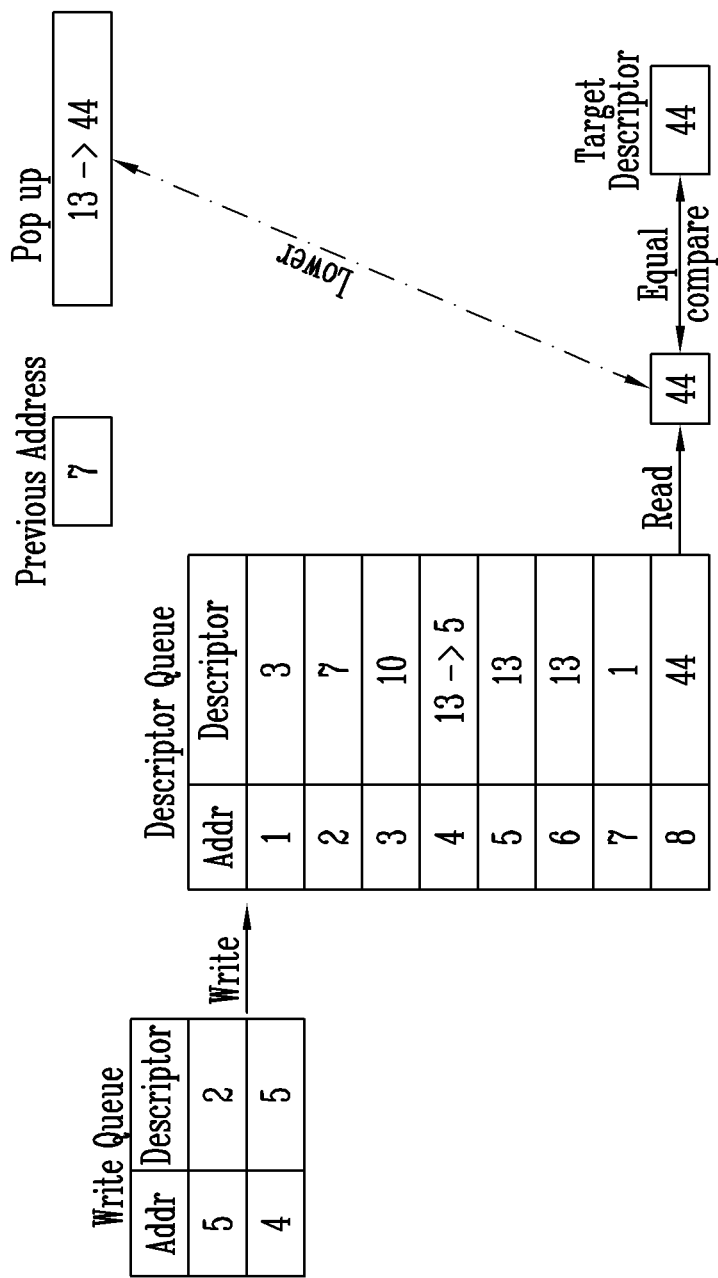

Referring to FIG. 5H, the selected address may be increased from the seventh address to an eighth address. The previous address may be the seventh address. Descriptor 44 corresponding to the selected address may be read. It may be determined whether read descriptor 44 matches target descriptor 44. Since read descriptor 44 matches target descriptor 44, the operation of searching for the target descriptor may be terminated.

If the map buffer is read with reference to the fourth address of the map buffer that corresponds to target descriptor 44, a map segment indicated by target descriptor 44 may be obtained. If map data having an offset of 5 is read from the obtained map segment, map data corresponding to logical address 04405 may be obtained.

Since the descriptor information stored in the write queue is present, the descriptor queue may be updated based on the descriptor information stored in the write queue. Therefore, descriptor 13 corresponding to the fourth address in the descriptor queue may be updated to descriptor 5.

The pop-up descriptor may be determined to be the maximum value of one or more descriptors read from the descriptor queue. Therefore, since pop-up descriptor 13 is less than read descriptor 44, pop-up descriptor 13 may be updated to read descriptor 44.

Figure 5I:
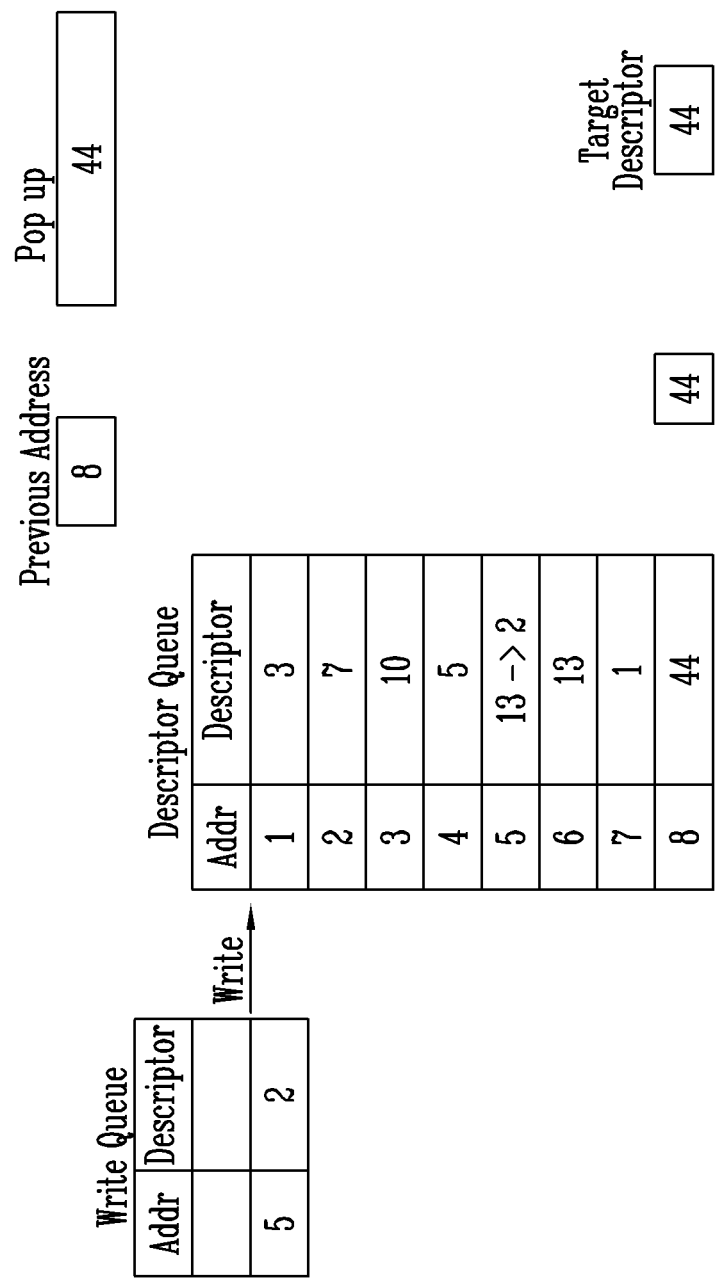

Referring to FIG. 5I, although the operation of searching for the target descriptor has been terminated, the descriptor information stored in the write queue is present, so that the descriptor queue may be updated based on the descriptor information stored in the write queue. Therefore, descriptor 13 corresponding to the fifth address in the descriptor queue may be updated to descriptor 2.

Figure 6:
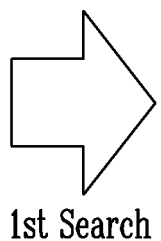
FIG. 6 is a diagram illustrating a descriptor ordering operation after the map searching operation.

FIG. 6 is a diagram illustrating a descriptor ordering operation after the map searching operation.

Referring to FIG. 6, it can be understood that after a map searching operation has been performed once in the forward direction, descriptors respectively corresponding to the first and second addresses are ordered in an ascending order. As the map searching operation is performed, the descriptors may be ordered in an ascending order based on the addresses. Since the descriptors stored in the descriptor queue have been ordered based on the addresses, a reverse searching operation may be performed in a subsequent map searching operation if the target descriptor is greater than the reference value, or a forward searching operation may be performed if the target descriptor is less than or equal to the reference value. Consequently, the time it takes to perform the map searching operation may be reduced.

In various embodiments, after the map searching operation has been performed, the descriptors stored in the descriptor queue may be ordered in a descending order based on the addresses.

FIGS. 7A to 7K are diagrams illustrating a reverse map searching operation and a descriptor reordering operation in accordance with an embodiment.

Figure 7A:
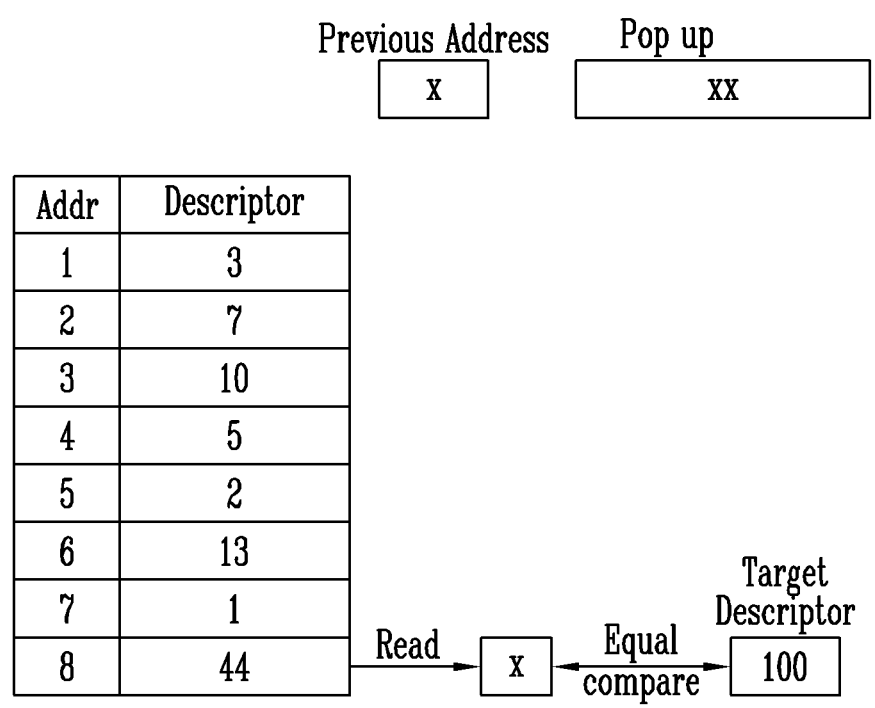
FIGS. 7A to 7K are diagrams illustrating a reverse map searching operation and a descriptor reordering operation in accordance with an embodiment.

Referring to FIG. 7A, the descriptor queue may be a descriptor queue obtained by ordering descriptors in an ascending order after the forward searching operation described with reference to FIG. 5I has been performed once.

In the description with reference to FIGS. 7A to 7K, it is assumed that the logical address is 10001. Upper three bits of the logical address may be used as a target descriptor, and lower two bits of the logical address may be used as an offset. A method of determining the value and descriptor of the logical address is not limited to embodiments of the present disclosure.

The target descriptor that indicates a map segment including the logical address may be 100. The memory controller 200 may search for the target descriptor in the descriptor queue and obtain an address of a map buffer 210 corresponding to the target descriptor. The memory controller 200 may obtain a map segment which is indicated by target descriptor 100 from the map buffer 210 based on the address. The memory controller 200 may obtain map data corresponding to logical address 10001 with reference to map data having an offset of 1 in the obtained map segment.

The searching direction may be determined depending on a result of the comparison between the target descriptor and the reference descriptor. If the target descriptor is greater than the reference descriptor, the searching direction may be determined to be a reverse direction. If the target descriptor is less than the reference descriptor, the searching direction may be determined to be a forward direction. In the description with reference to FIGS. 7A to 7K, it is assumed that the reference descriptor is 50. In FIGS. 7A to 7K, since target descriptor 100 is greater than reference descriptor 50, the target descriptor may be searched for in the reverse direction.

Figure 7B:
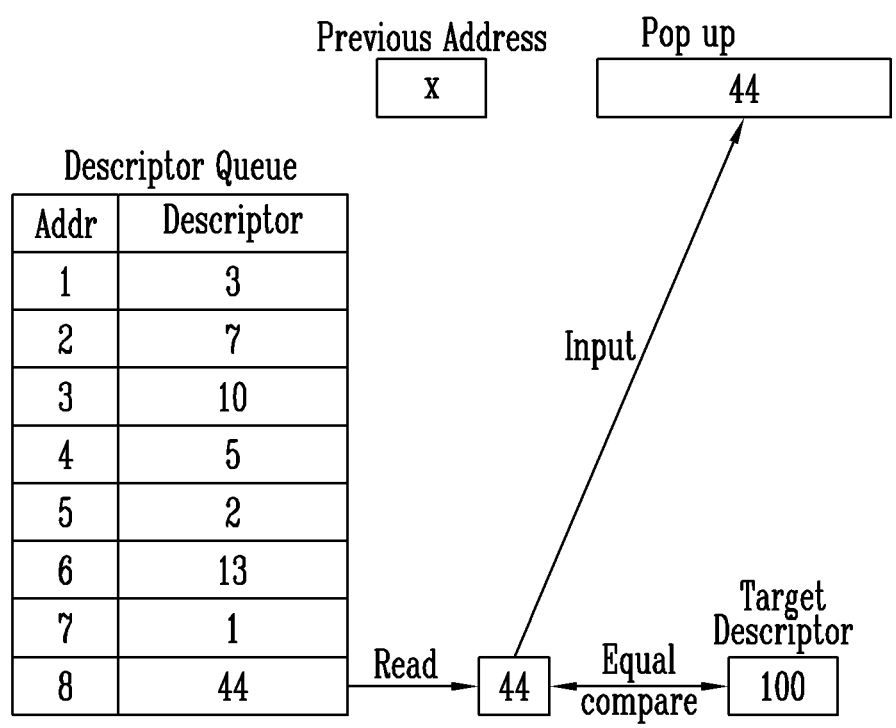

Referring to FIGS. 7A and 7B, since the searching direction is the reverse direction, an eighth address of the plurality of addresses Addr1 to Addr8 may be determined to be a selected address. Descriptor 44 corresponding to the selected address may be read. It may be determined whether read descriptor 44 matches target descriptor 100. Since read descriptor 44 does not match target descriptor 100, the operation of searching for the target descriptor may be performed in a direction in which the selected address decreases.

The pop-up descriptor may be determined based on the minimum value of one or more descriptors read from the descriptor queue. Since read descriptor 44 is the minimum value of the one or more descriptors read from the descriptor queue, read descriptor 44 may be set to the pop-up descriptor.

Figure 7C:
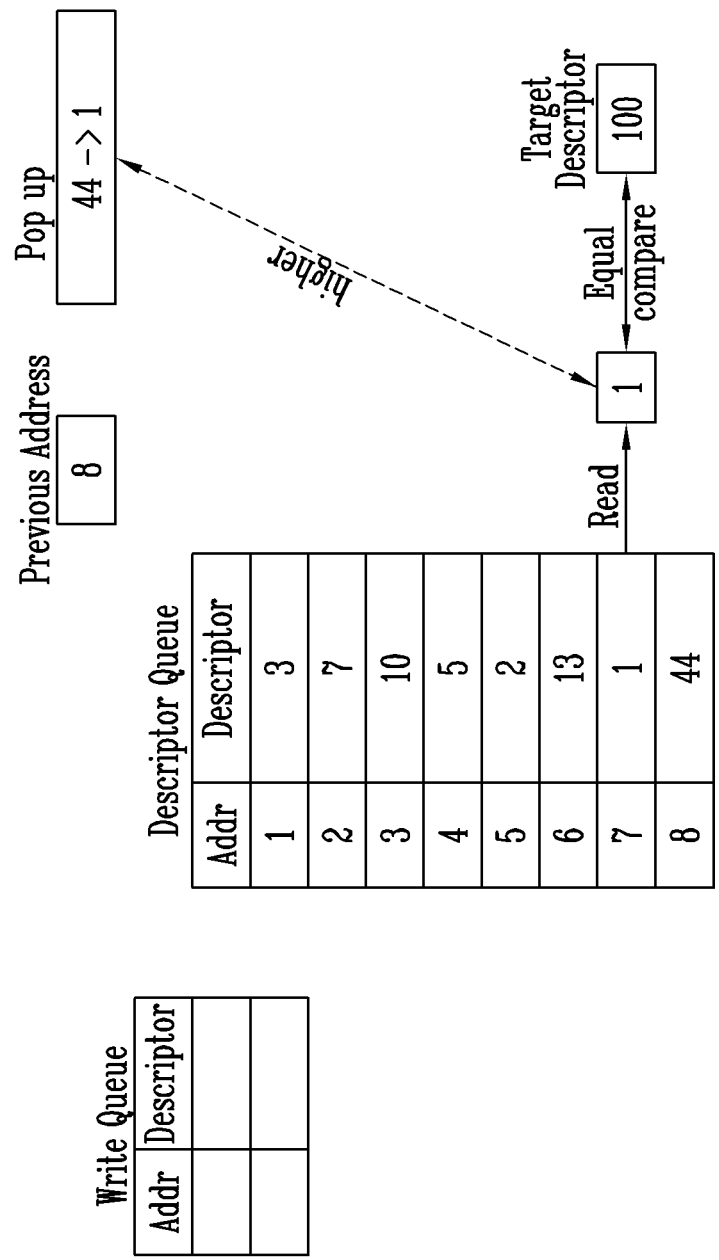

Referring to FIG. 7C, the selected address may be decreased from the eighth address to a seventh address. The previous address may be the eighth address. Descriptor 1 corresponding to the selected address may be read. It may be determined whether read descriptor 1 matches target descriptor 100. Since read descriptor 1 does not match target descriptor 100, the operation of searching for the target descriptor may be performed in a direction in which the selected address decreases.

Since read descriptor 1 differs from target descriptor 100, read descriptor 1 may be compared with pop-up descriptor 44. Since pop-up descriptor 44 is greater than read descriptor 1, pop-up descriptor 44 may be updated to read descriptor 1.

Figure 7D:
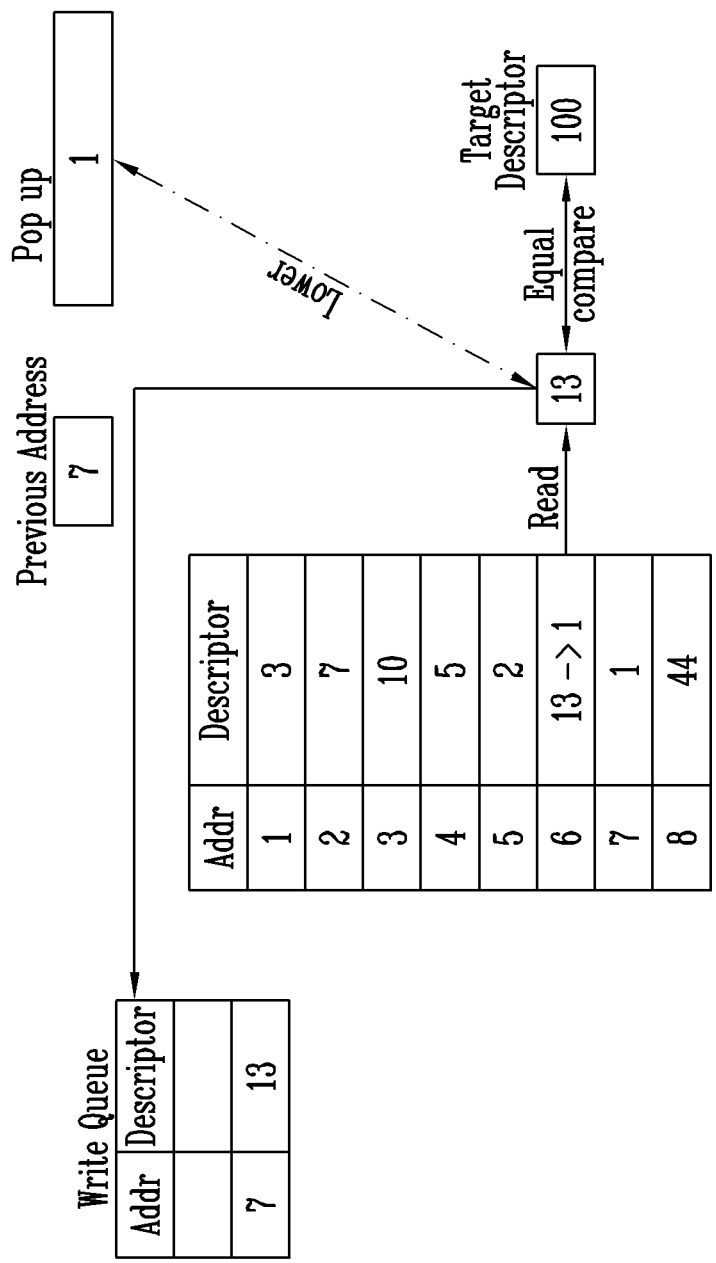

Referring to FIG. 7D, the selected address may be decreased from the seventh address to a sixth address. The previous address may be the seventh address. Descriptor 13 corresponding to the selected address may be read. It may be determined whether read descriptor 13 matches target descriptor 100. Since read descriptor 13 does not match target descriptor 100, the operation of searching for the target descriptor may be performed in a direction in which the selected address decreases.

Since read descriptor 13 differs from target descriptor 100, read descriptor 13 may be compared with pop-up descriptor 1. Since pop-up descriptor 1 is less than read descriptor 13, descriptor information including read descriptor 13 and the seventh address that is the previous address may be stored in the write queue. Descriptor 13 corresponding to the sixth address that is the selected address in the descriptor queue may be updated to 1 that is the pop-up descriptor.

Figure 7E:
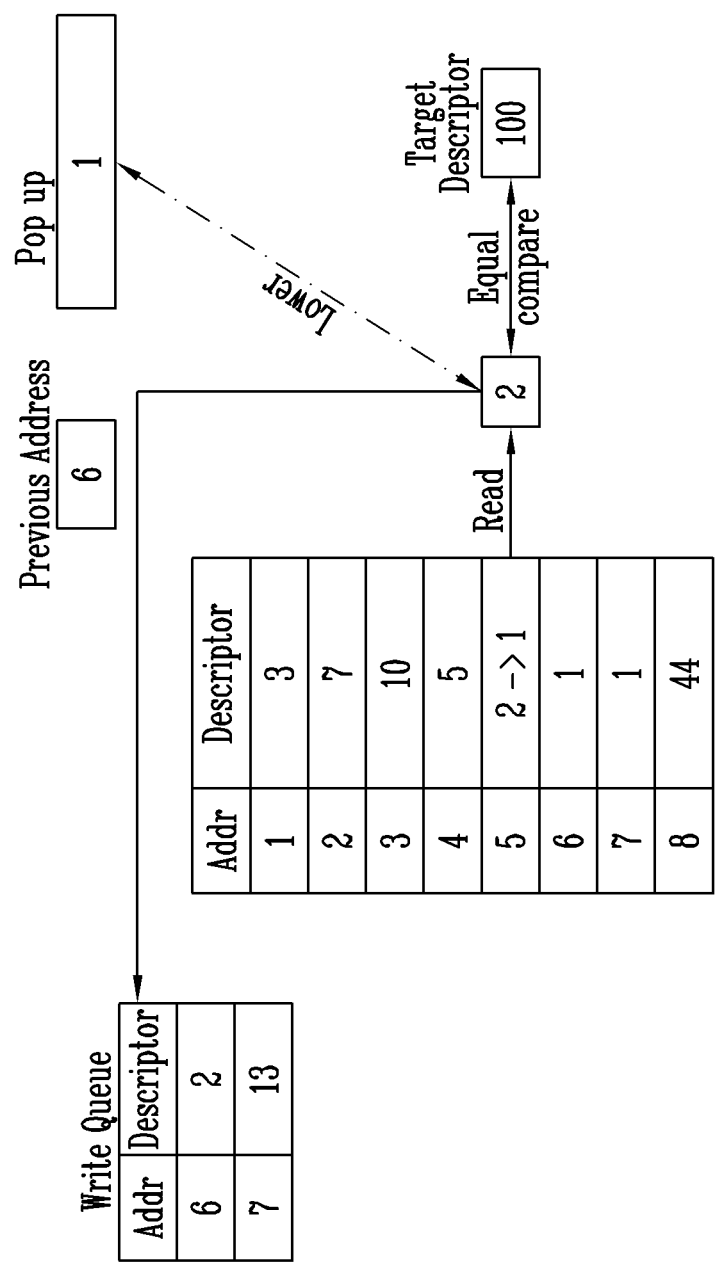

Referring to FIG. 7E, the selected address may be decreased from the sixth address to a fifth address. The previous address may be the sixth address. Descriptor 2 corresponding to the selected address may be read. It may be determined whether read descriptor 2 matches target descriptor 100. Since read descriptor 2 does not match target descriptor 100, the operation of searching for the target descriptor may be performed in a direction in which the selected address decreases.

Since read descriptor 2 differs from target descriptor 100, read descriptor 2 may be compared with pop-up descriptor 1. Since pop-up descriptor 1 is less than read descriptor 2, descriptor information including read descriptor 2 and the sixth address that is the previous address may be stored in the write queue. Descriptor 2 corresponding to the fifth address that is the selected address in the descriptor queue may be updated to 1 that is the pop-up descriptor.

Figure 7F:
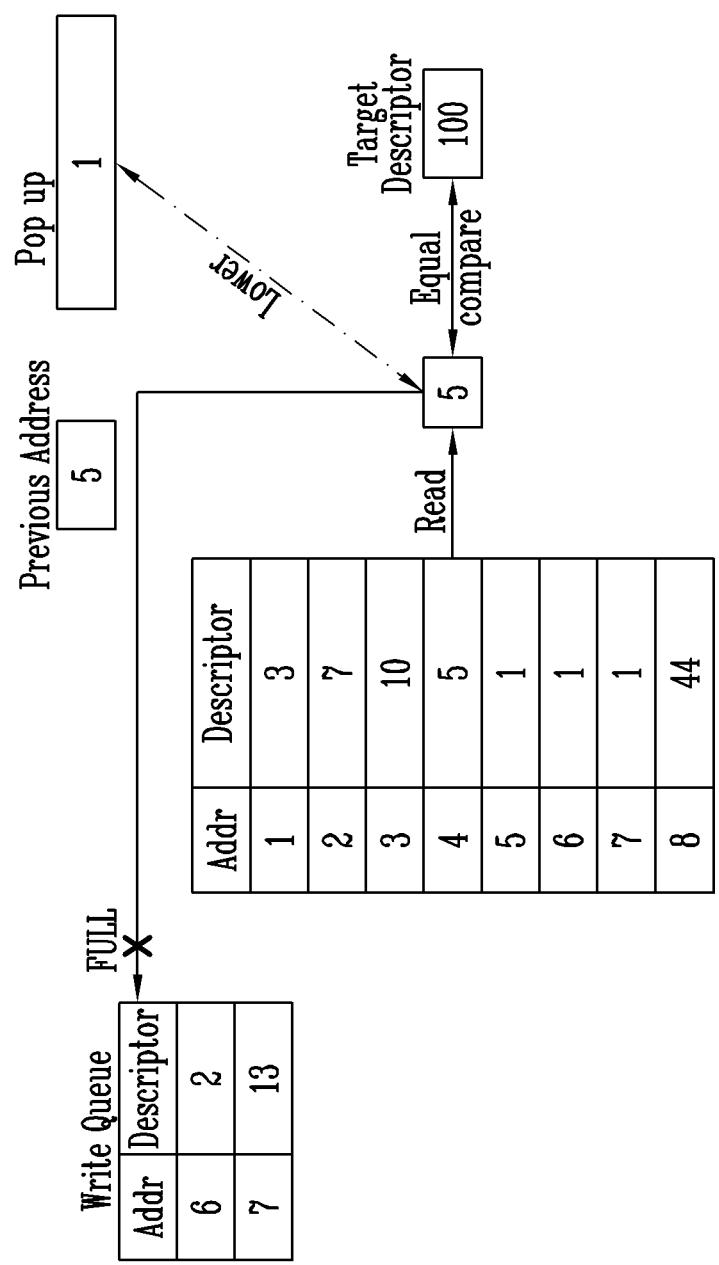

Referring to FIG. 7F, the selected address may be decrease from the fifth address to a fourth address. The previous address may be the fifth address. Descriptor 5 corresponding to the selected address may be read. It may be determined whether read descriptor 5 matches target descriptor 100. Since read descriptor 5 does not match target descriptor 100, the operation of searching for the target descriptor may be performed in a direction in which the selected address decreases.

Since read descriptor 5 differs from target descriptor 100, read descriptor 5 may be compared with pop-up descriptor 1. Since pop-up descriptor 1 is less than read descriptor 5, descriptor information including read descriptor 5 and the fifth address that is the previous address is required to be stored in the write queue. However, because the write queue is full, the descriptor information may not be stored in the write queue. Therefore, descriptor 5 corresponding to the fourth address that is the selected address in the descriptor queue may not be updated to 1 that is the pop-up descriptor.

Figure 7G:
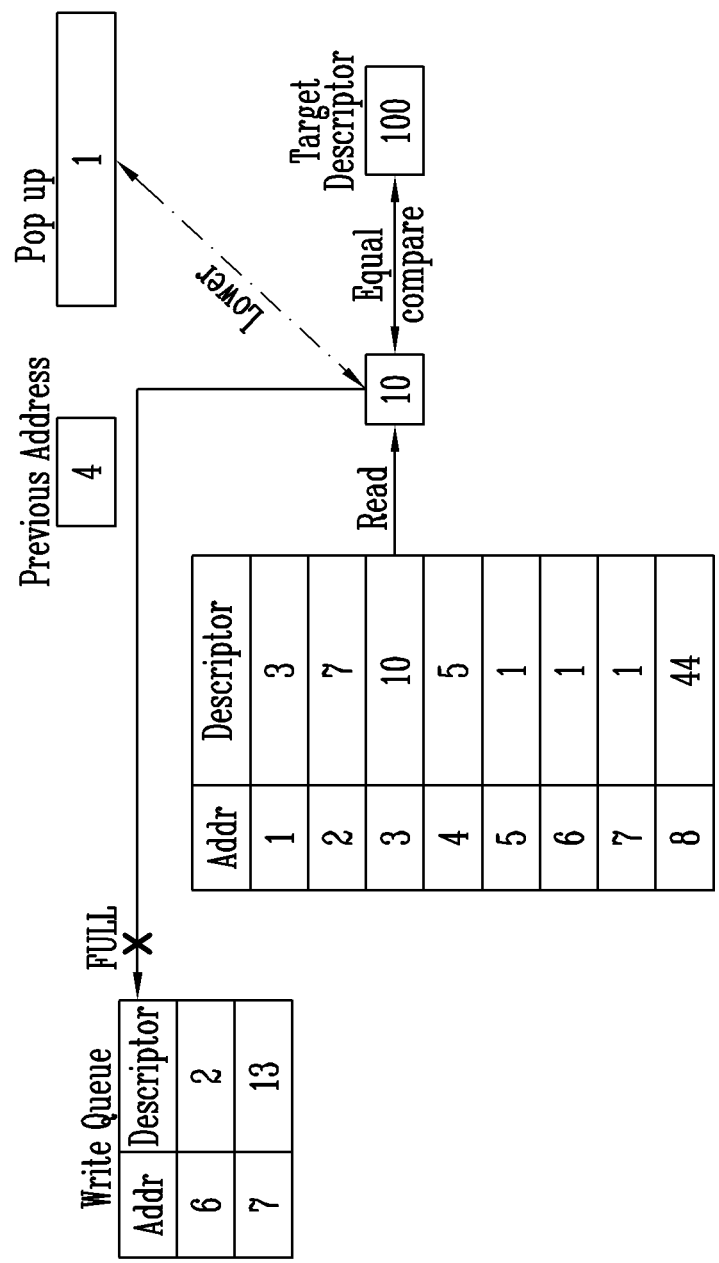

Referring to FIG. 7G, the selected address may be reduced from the fourth address to a third address. The previous address may be the fourth address. Descriptor 10 corresponding to the selected address may be read. It may be determined whether read descriptor 10 matches target descriptor 100. Since read descriptor 10 does not match target descriptor 100, the operation of searching for the target descriptor may be performed in a direction in which the selected address decreases.

Since read descriptor 10 differs from target descriptor 100, read descriptor 10 may be compared with pop-up descriptor 1. Since pop-up descriptor 1 is less than read descriptor 10, descriptor information including read descriptor 4 and the fourth address that is the previous address is required to be stored in the write queue. However, because the write queue is full, the descriptor information may not be stored in the write queue. Therefore, descriptor 10 corresponding to the third address that is the selected address in the descriptor queue may not be updated to 1 that is the pop-up descriptor.

Figure 7H:
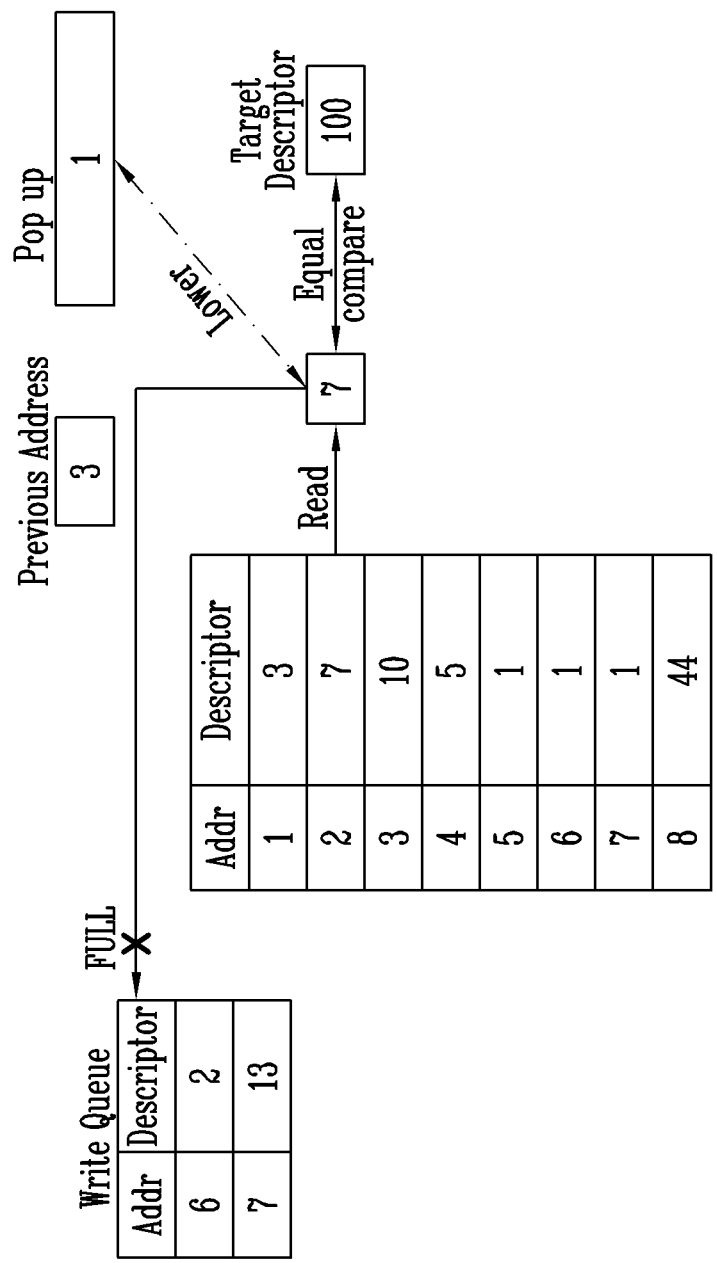

Referring to FIG. 7H, the selected address may be decreased from the third address to a second address. The previous address may be the third address. Descriptor 7 corresponding to the selected address may be read. It may be determined whether read descriptor 7 matches target descriptor 100. Since read descriptor 7 does not match target descriptor 100, the operation of searching for the target descriptor may be performed in a direction in which the selected address decreases.

Since read descriptor 7 differs from target descriptor 100, read descriptor 7 may be compared with pop-up descriptor 1. Since pop-up descriptor 1 is less than read descriptor 7, descriptor information including read descriptor 7 and the third address that is the previous address is required to be stored in the write queue. However, because the write queue is full, the descriptor information may not be stored in the write queue. Therefore, descriptor 7 corresponding to the second address that is the selected address in the descriptor queue may not be updated to 1 that is the pop-up descriptor.

Figure 7I:
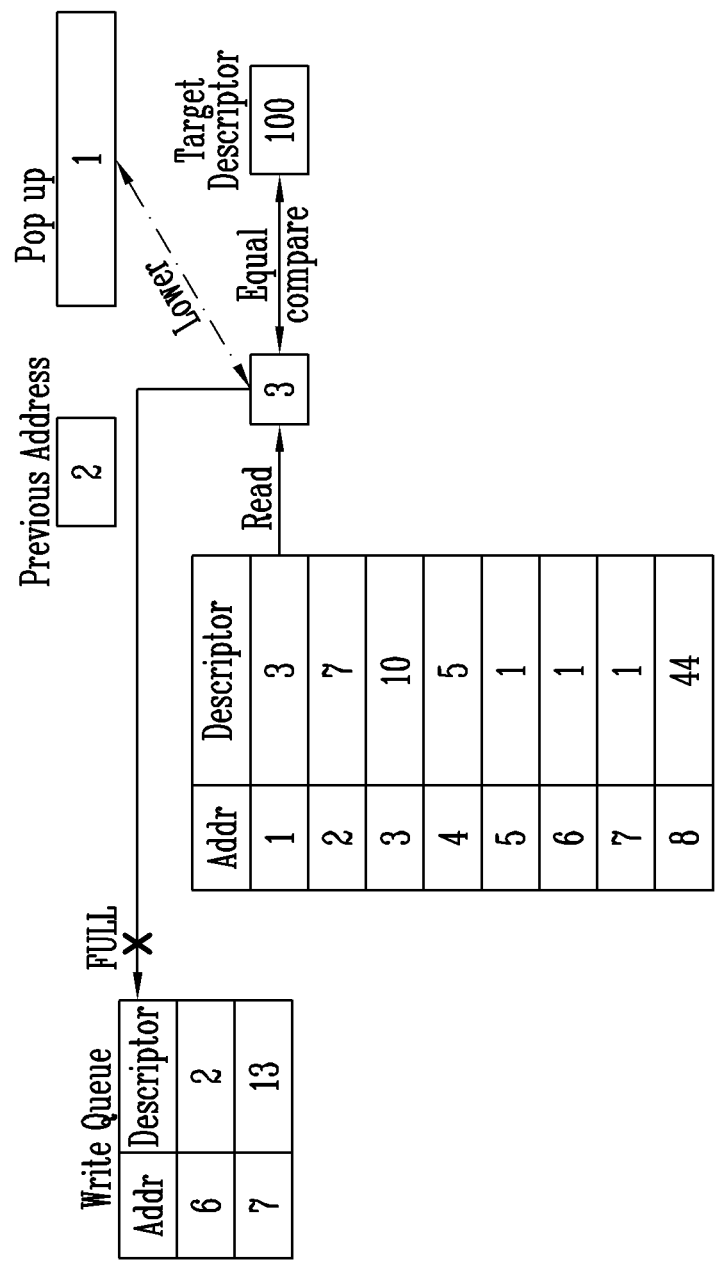

Referring to FIG. 7I, the selected address may be decreased from the second address to a first address. The previous address may be the second address. Descriptor 3 corresponding to the selected address may be read. It may be determined whether read descriptor 3 matches target descriptor 100. Since read descriptor 3 does not matches target descriptor 100 and all of the descriptors stored in the descriptor queue are in the read state, the operation of searching for the target descriptor may be terminated.

Since read descriptor 3 differs from target descriptor 100, read descriptor 3 may be compared with pop-up descriptor 1. Since pop-up descriptor 1 is less than read descriptor 3, descriptor information including read descriptor 3 and the second address that is the previous address is required to be stored in the write queue. However, because the write queue is full, the descriptor information may not be stored in the write queue. Therefore, descriptor 3 corresponding to the first address that is the selected address in the descriptor queue may not be updated to 1 that is the pop-up descriptor.

Figure 7J:
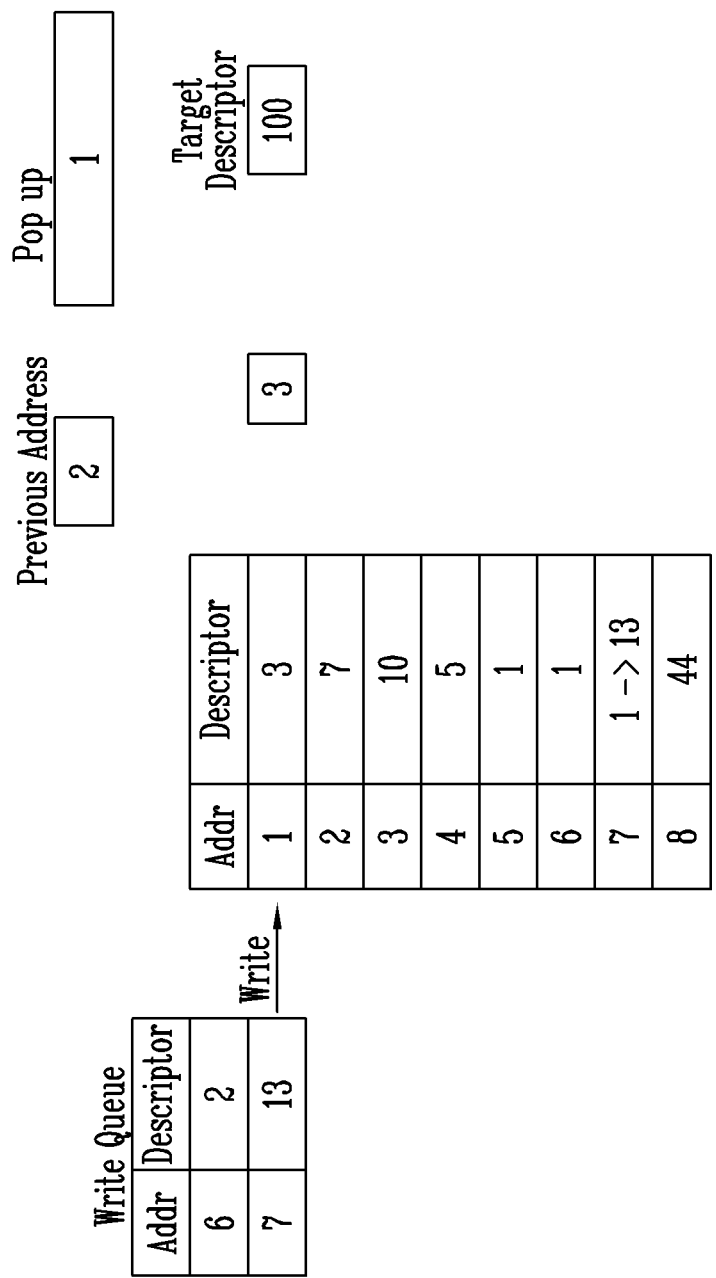

Referring to FIG. 7J, although the operation of searching for the target descriptor has been terminated, the descriptor information stored in the write queue is present, so that the descriptor queue may be updated based on the descriptor information stored in the write queue. Therefore, descriptor 1 corresponding to the seventh address in the descriptor queue may be updated to descriptor 13.

Figure 7K:
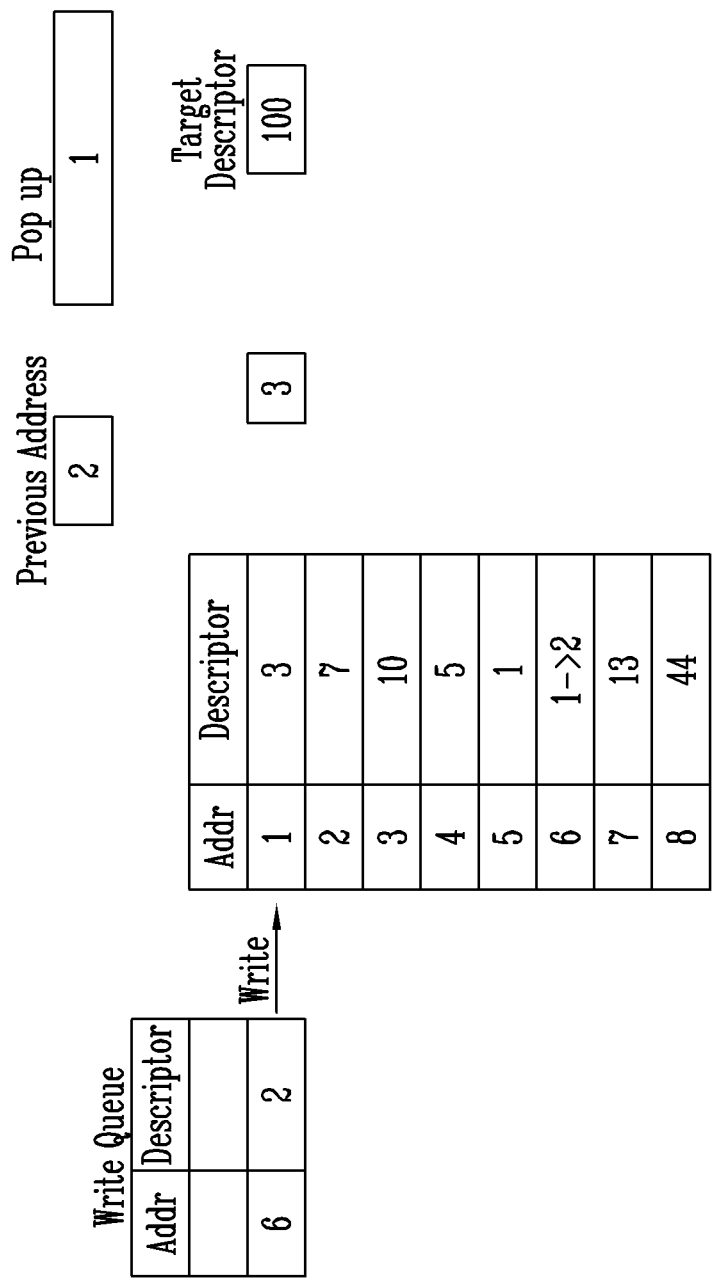

Referring to FIG. 7K, although the operation of searching for the target descriptor has been terminated, the descriptor information stored in the write queue is present, so that the descriptor queue may be updated based on the descriptor information stored in the write queue. Therefore, descriptor 1 corresponding to the sixth address in the descriptor queue may be updated to descriptor 2.

Figure 8:
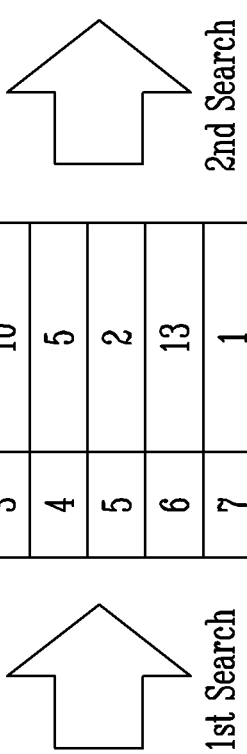
FIG. 8 is a diagram illustrating a descriptor ordering operation after the map searching operation.

FIG. 8 is a diagram illustrating a descriptor ordering operation after the map searching operation.

FIG. 8 illustrates a descriptor queue obtained by performing the forward map searching operation described with reference to FIGS. 5A to 5I and a descriptor queue obtained by performing the reverse map searching operation described with reference to FIGS. 7A to 7K.

It can be understood that after a map searching operation has been performed once in the forward direction, descriptors respectively corresponding to the first and second addresses are ordered in an ascending order. Thereafter, it can be understood that after a map searching operation has been performed once in the reverse direction, descriptors respectively corresponding to the fifth, sixth, and seventh addresses are ordered in an ascending order. In other words, as the map searching operation is repeatedly performed, the descriptor stored in the descriptor queue is ordered in an ascending order. Therefore, the time it takes to search for the target descriptor in a searching direction determined depending on a result of comparison between the target descriptor and the reference descriptor may be reduced.

In various embodiments, as map searching operations are repeatedly performed, the descriptor stored in the descriptor queue may be ordered in a descending order.

Figure 9:
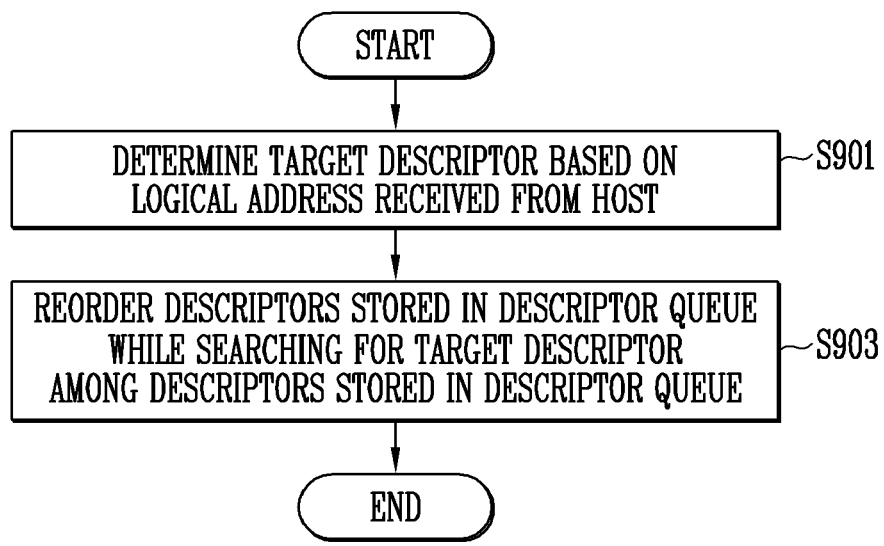
FIG. 9 is a flowchart illustrating operation of a memory controller in accordance with an embodiment.

FIG. 9 is a flowchart illustrating the operation of the memory controller 200 in accordance with an embodiment.

Referring to FIG. 9, at step S901, the memory controller 200 may determine a target descriptor based on a logical address received from the host 300. The target descriptor may be an index indicating a map segment including a logical address. In an embodiment, the target descriptor may be determined based on a portion of a logical address value.

At step S903, the memory controller 200 may reorder the descriptors stored in the descriptor queue in connection with searching for the target descriptor among the descriptors stored in the descriptor queue.

In an embodiment, since the descriptors are reordered as part of the search for the target descriptor, the time required to order the descriptors stored in the descriptor queue may be reduced, and the time it takes to search for a subsequent descriptor may also be reduced.

Figure 10:
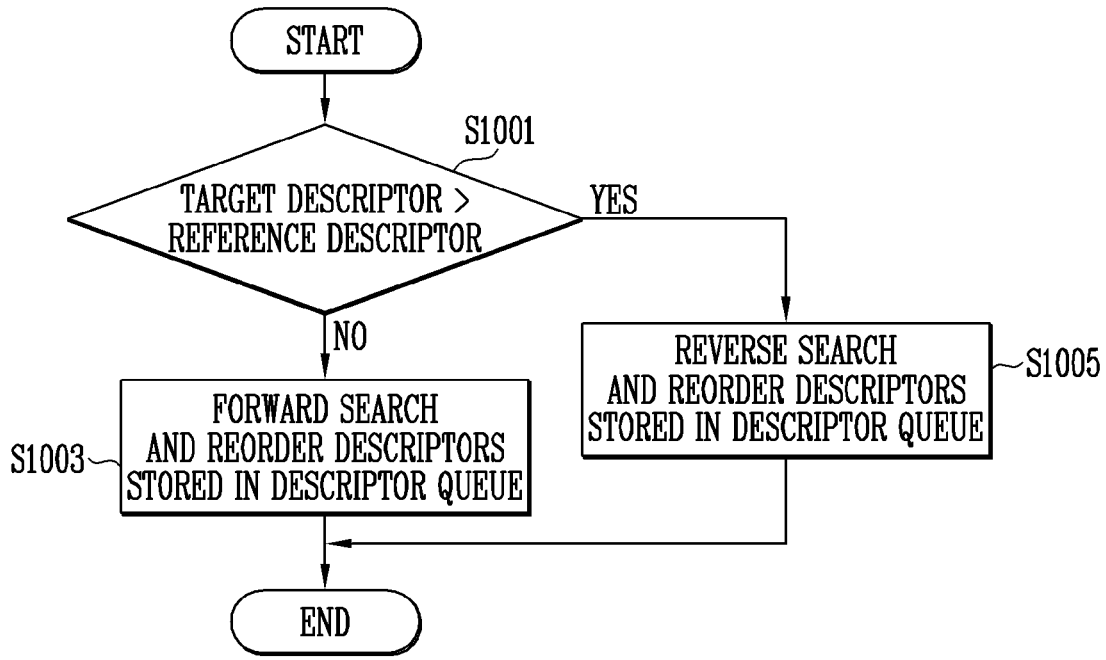
FIG. 10 is a flowchart illustrating in detail operation of a memory controller.

FIG. 10 is a flowchart illustrating in detail the operation of the memory controller 200 of FIG. 9.

Referring to FIG. 10, at step S1001, the memory controller 200 may determine whether the target descriptor is greater than the reference descriptor. As a result of the determination, if the target descriptor is greater than the reference descriptor, the process may proceed to step S1005. If the target descriptor is less than or equal to the reference descriptor, the process may proceed to step S1003.

At step S1003, the memory controller 200 may search for the target descriptor in the forward direction, reorder the descriptors stored in the descriptor queue in the process of searching for the target descriptor. Then, the memory controller 200 may terminate the process.

At step S1005, the memory controller 200 may search for the target descriptor in the reverse direction, reorder the descriptors stored in the descriptor queue in the process of searching for the target descriptor. Then, the memory controller 200 may terminate the process.

Figure 11:
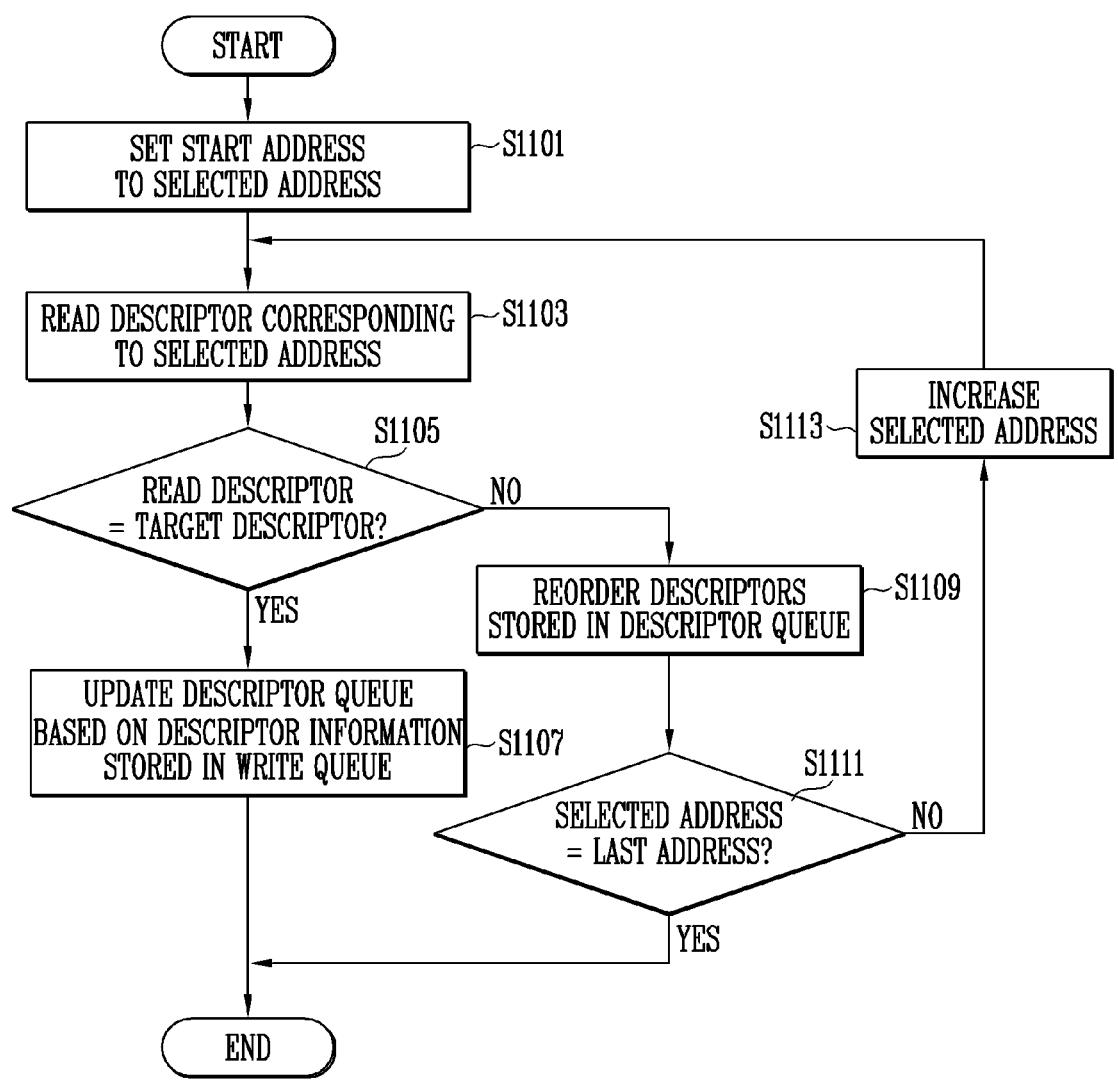
FIG. 11 is a flowchart illustrating a forward search operation of FIG. 10.

FIG. 11 is a flowchart illustrating the forward searching operation S1003 of FIG. 10.

Referring to FIG. 11, at step S1101, the memory controller 200 may set a start address of the plurality of addresses of the map buffer to a selected address.

At step S1103, the memory controller 200 may read a descriptor corresponding to the selected address.

At step S1105, the memory controller 200 may determine whether the read descriptor matches the target descriptor. As a result of the determination, if the read descriptor matches the target descriptor, the process may proceed to step S1107. If the read descriptor does not match the target descriptor, the process may proceed to step S1109.

At step S1107, the memory controller 200 may update the descriptor queue based on the descriptor information stored in the write queue and then may terminate the process.

At step S1109, the memory controller 200 may reorder the descriptors stored in the descriptor queue.

At step S1111, the memory controller 200 may determine whether the selected address is a last address of the plurality of addresses of the map buffer. As a result of the determination, if the selected address is the last address, the process may be terminated. If the selected address is not the last address, the process may proceed to step S1113.

At step S1113, the memory controller 200 may increase the selected address and then return to step S1103.

Figure 12:
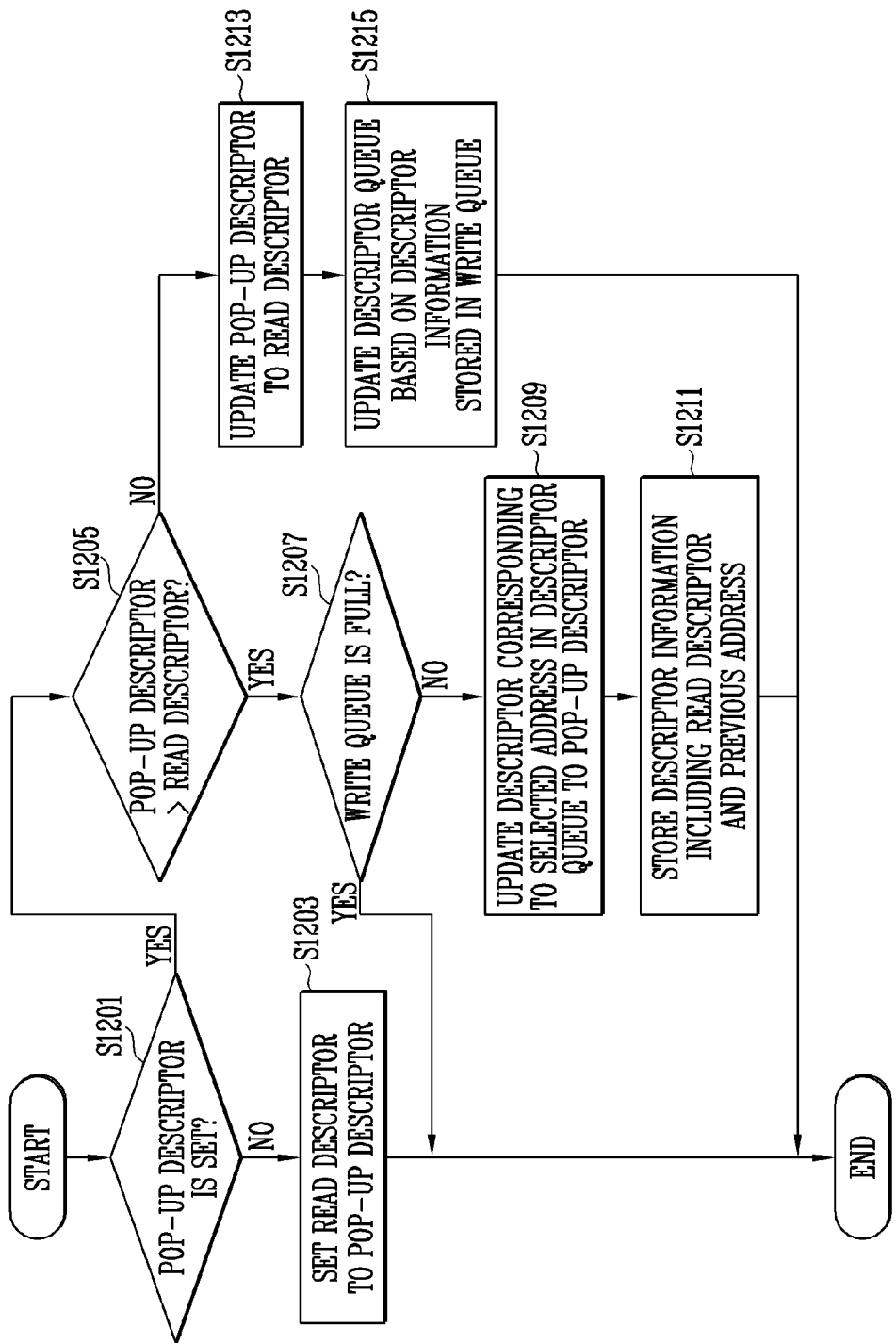
FIG. 12 is a flowchart illustrating step S1109 of FIG. 11.

FIG. 12 is a flowchart illustrating step S1109 of FIG. 11.

Referring to FIG. 12, at step S1201, the memory controller 200 may determine whether the pop-up descriptor has been set. When a forward searching operation is performed, the pop-up descriptor may be set to the maximum value of one or more descriptors read from the descriptor queue. As a result of the determination, if the pop-up descriptor has not been set, the process may proceed to step S1203. If the pop-up descriptor has been set, the process may proceed to step S1205.

At step S1203, the memory controller 200 may set the read descriptor to the pop-up descriptor and then may terminate the process.

At step S1205, the memory controller 200 may determine whether the pop-up descriptor is greater than the read descriptor. As a result of the determination, if the pop-up descriptor is greater than the read descriptor, the process may proceed to step S1207. If the pop-up descriptor is less than the read descriptor, the process may proceed to step S1213.

At step S1207, the memory controller 200 may determine whether the write queue is full. As a result of the determination, if the write queue is full, the process may be terminated. If the write queue is not full, the process may proceed to step S1209.

At step S1209, the memory controller 200 may update a descriptor corresponding to the selected address in the descriptor queue to the pop-up descriptor.

At step S1211, the memory controller 200 may store descriptor information including the read descriptor and the previous address in the write queue and then may terminate the process.

At step S1213, the pop-up descriptor may be updated to the read descriptor.

At step S1215, the descriptor queue may be updated based on the descriptor information stored in the write queue and then may terminate the process.

Figure 13:
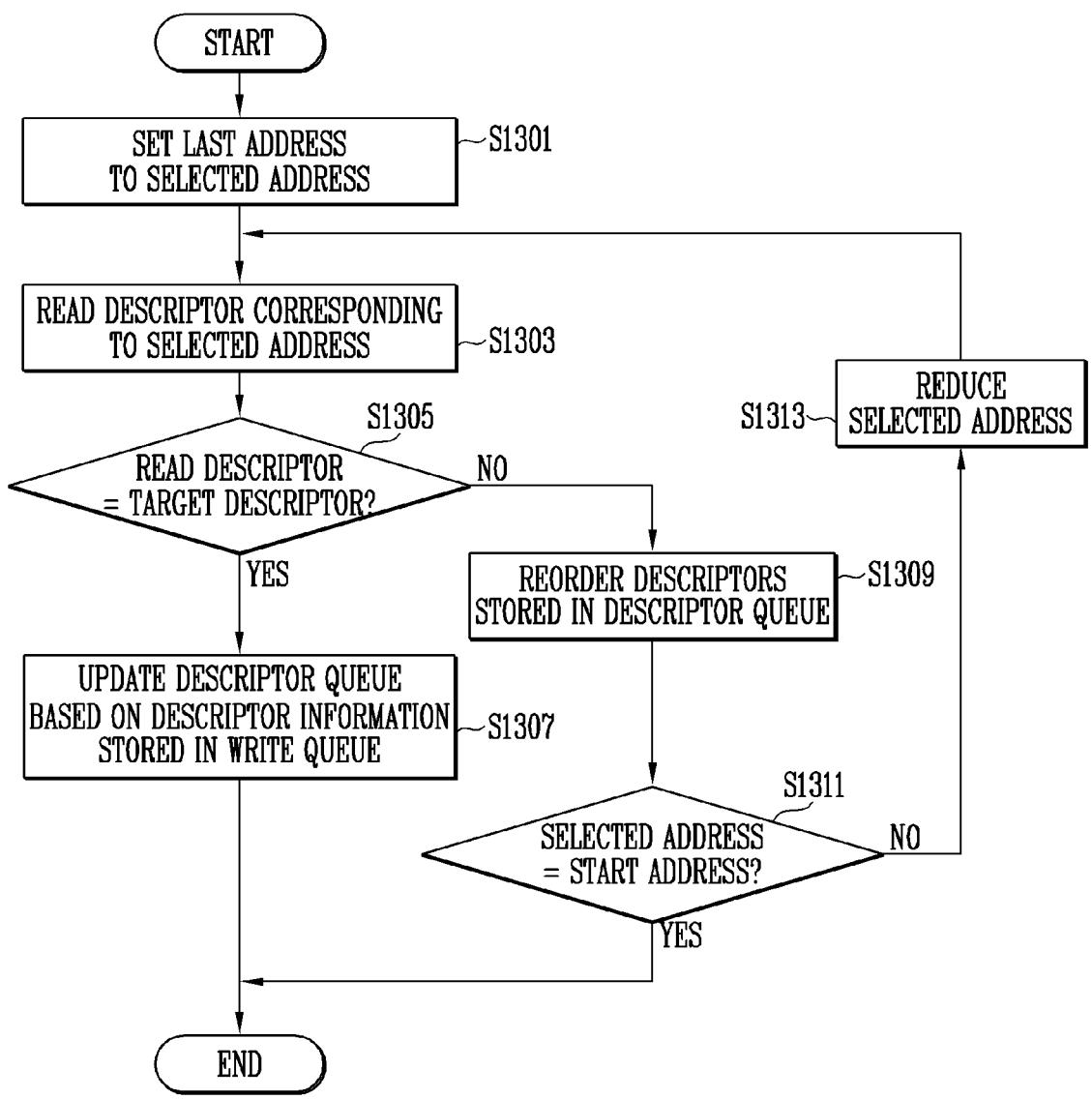
FIG. 13 is a flowchart illustrating a reverse search operation of FIG. 10.

FIG. 13 is a flowchart illustrating a reverse searching operation S1005 of FIG. 10.

Referring to FIG. 13, at step S1301, the memory controller 200 may set a last address of the plurality of addresses of the map buffer to a selected address.

At step S1303, the memory controller 200 may read a descriptor corresponding to the selected address.

At step S1305, the memory controller 200 may determine whether the read descriptor matches the target descriptor. As a result of the determination, if the read descriptor matches the target descriptor, the process may proceed to step S1307. If the read descriptor does not match the target descriptor, the process may proceed to step S1309.

At step S1307, the memory controller 200 may update the descriptor queue based on the descriptor information stored in the write queue and then may terminate the process.

At step S1309, the memory controller 200 may reorder the descriptors stored in the descriptor queue.

At step S1311, the memory controller 200 may determine whether the selected address is a start address of the plurality of addresses of the map buffer. As a result of the determination, if the selected address is the start address, the process may be terminated. If the selected address is not the last address, the process may proceed to step S1313.

At step S1313, the memory controller 200 may decrease the selected address and then return to step S1303.

Figure 14:
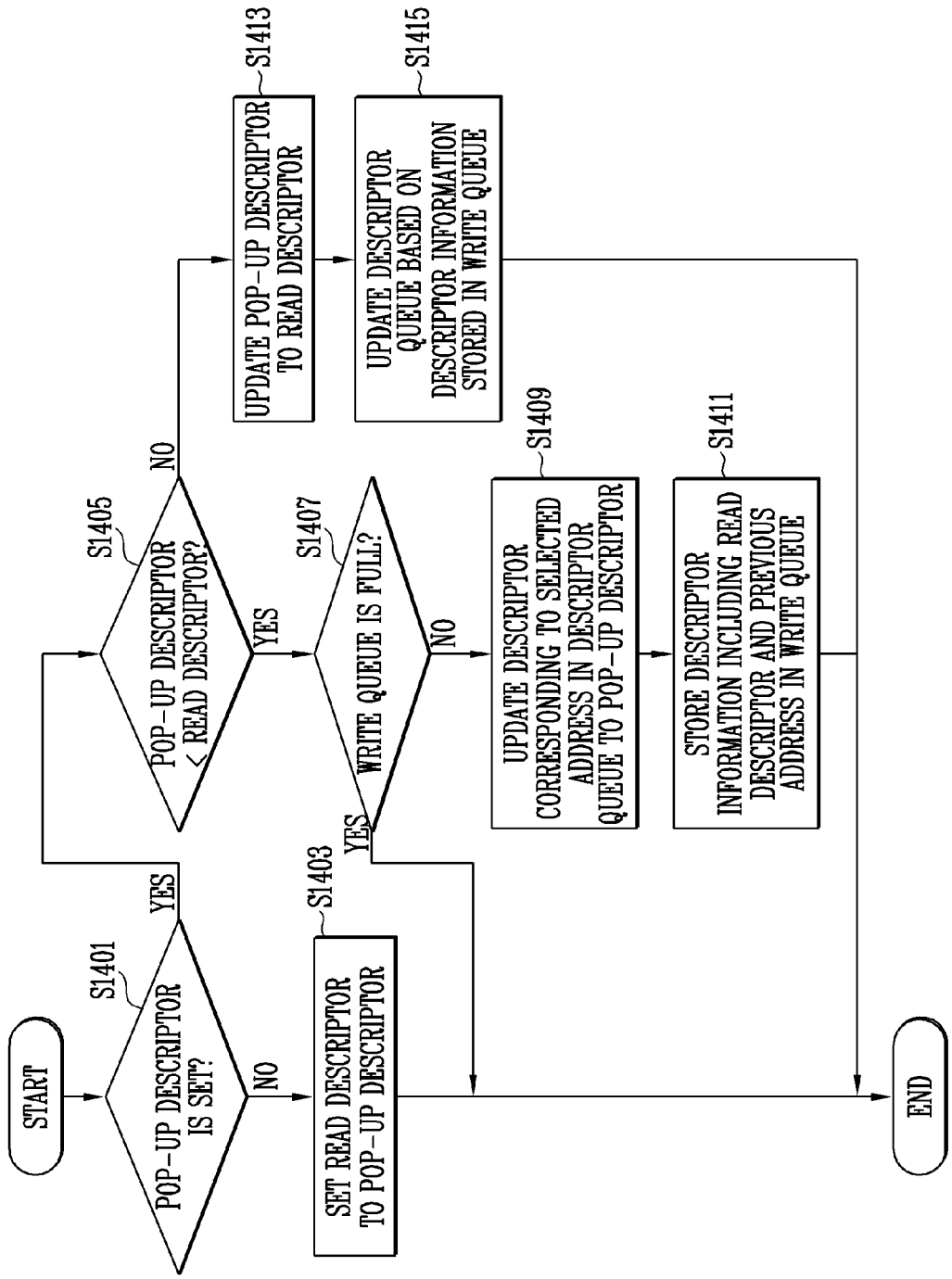
FIG. 14 is a flowchart illustrating step S1309 of FIG. 13.

FIG. 14 is a flowchart illustrating step S1109 of FIG. 13.

Referring to FIG. 14, at step S1401, the memory controller 200 may determine whether the pop-up descriptor has been set. When a reverse searching operation is performed, the pop-up descriptor may be set to the minimum value of one or more descriptors read from the descriptor queue. As a result of the determination, if the pop-up descriptor has not been set, the process may proceed to step S1403. If the pop-up descriptor has been set, the process may proceed to step S1405.

At step S1403, the memory controller 200 may set the read descriptor to the pop-up descriptor and then may terminate the process.

At step S1405, the memory controller 200 may determine whether the pop-up descriptor is less than the read descriptor. As a result of the determination, if the pop-up descriptor is less than the read descriptor, the process may proceed to step S1407. If the pop-up descriptor is greater than the read descriptor, the process may proceed to step S1413.

At step S1407, the memory controller 200 may determine whether the write queue is full. As a result of the determination, if the write queue is full, the process may be terminated. If the write queue is not full, the process may proceed to step S1409.

At step S1409, the memory controller 200 may update a descriptor corresponding to the selected address in the descriptor queue to the pop-up descriptor.

At step S1411, the memory controller 200 may store descriptor information including the read descriptor and the previous address in the write queue and then may terminate the process.

At step S1413, the pop-up descriptor may be updated to the read descriptor.

At step S1415, the descriptor queue may be updated based on the descriptor information stored in the write queue and then may terminate the process.

Figure 15:
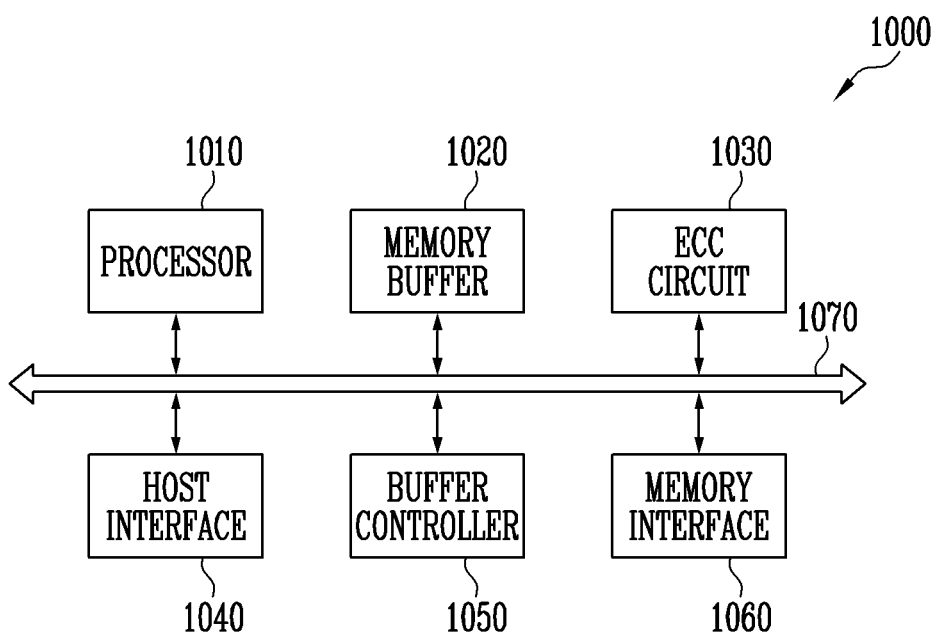
FIG. 15 is a diagram illustrating an example of the memory controller of FIG. 1.

FIG. 15 is a diagram illustrating an example of the memory controller of FIG. 1.

Referring to FIG. 15, a memory controller 1000 is coupled to a host and a memory device. In response to a request from the host, the memory controller 1000 may access the memory device. For example, the memory controller 1000 may control a write operation, a read operation, an erase operation, and a background operation of the memory device. The memory controller 1000 may provide an interface between the memory device and the host. The memory controller 1000 may drive firmware for controlling the memory device.

The memory controller 1000 may include a processor 1010, a memory buffer 1020, an error correction code (ECC) circuit 1030, a host interface 1040, a buffer controller 1050, a memory interface 1060, and a bus 1070.

The bus 1070 may provide a channel between the components of the memory controller 1000.

The processor 1010 may control overall operation of the memory controller 1000 and perform a logical operation. The processor 1010 may communicate with the external host through the host interface 1040, and communicate with the memory device through the memory interface 1060. In addition, the processor 1010 may communicate with the memory buffer 1020 through the buffer controller 1050. The processor 1010 may control the operation of the storage device by using the memory buffer 1020 as an operating memory, a cache memory, or a buffer memory.

The processor 1010 may perform the function of a flash translation layer (FTL). The processor 1010 may translate a logical block address (LBA), provided by the host, into a physical block address (PBA) through the FTL. The FTL may receive the LBA and translate the LBA into the PBA using a mapping table. Different address mapping methods using the FTL may be used depending on the unit of mapping. Representative address mapping methods include a page mapping method, a block mapping method, and a hybrid mapping method.

The processor 1010 may randomize data received from the host. For example, the processor 1010 may use a randomizing seed to randomize data received from the host. Randomized data may be provided to the memory device as data to be stored, and may be programmed to the memory cell array.

During a read operation, the processor 1010 may derandomize data received from the memory device 100. For example, the processor 1010 may use a derandomizing seed to derandomize data received from the memory device. Derandomized data may be output to the host.

In an embodiment, the processor 1010 may drive software or firmware to perform the randomizing operation or the derandomizing operation.

The memory buffer 1020 may be used as an operating memory, a cache memory, or a buffer memory of the processor 1010. The memory buffer 1020 may store codes and commands to be executed by the processor 1010. The memory buffer 1020 may store data to be processed by the processor 1010. The memory buffer 1020 may include a static RAM (SRAM) or a dynamic RAM (DRAM).

The ECC circuit 1030 may perform error correction. The ECC circuit 1030 may perform an ECC encoding operation based on data to be written to the memory device through the memory interface 1060. ECC encoded data may be transmitted to the memory device through the memory interface 1060. The ECC circuit 1030 may perform an ECC decoding operation on data received from the memory device through the memory interface 1060. For example, the ECC circuit 1030 may be included in the memory interface 1060 as a component of the memory interface 1060.

The host interface 1040 may communicate with the external host under control of the processor 1010. The host interface 1040 may perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), multiMedia card (MMC), an embedded MMC (eMMC), a dual in-line memory module (DIMM), a registered DIMM (RDIMM), and/or a load reduced DIMM (LRDIMM) communication methods.

The buffer controller 1050 may control the memory buffer 1020 under control of the processor 1010.

The memory interface 1060 may communicate with the memory device under control of the processor 1010. The memory interface 1060 may communicate a command, an address, and data with the memory device through the channel.

In another embodiment, the memory controller 1000 may include neither the memory buffer 1020 nor the buffer controller 1050. Instead, each of these components may be disposed externally to the memory controller 1000, or the functions of one or both of these components may be distributed to other component(s) within the memory controller 1000.

For example, the processor 1010 may use codes to control the operation of the memory controller 1000. The processor 1010 may load codes from a nonvolatile memory device (e.g., a read only memory) provided in the memory controller 1000. Alternatively, the processor 1010 may load codes from the memory device through the memory interface 1060.

For example, the bus 1070 of the memory controller 1000 may be divided into a control bus and a data bus. The data bus may transmit data in the memory controller 1000. The control bus may transmit control information such as a command and an address in the memory controller 1000. The data bus and the control bus may be separated such that neither interferes with, nor affects, the other. The data bus may be coupled to the host interface 1040, the buffer controller 1050, the ECC circuit 1030, and the memory interface 1060. The control bus may be coupled to the host interface 1040, the processor 1010, the buffer controller 1050, the memory buffer 1020, and the memory interface 1060.

Figure 16:
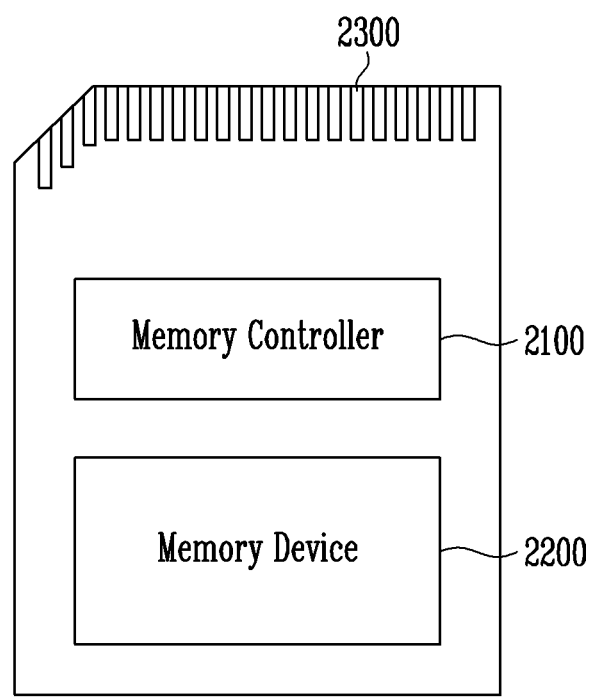
FIG. 16 is a block diagram illustrating a memory card system to which the storage device is applied in accordance with an embodiment of the present disclosure.

FIG. 16 is a block diagram illustrating a memory card system 2000 to which the storage device is applied in accordance with an embodiment of the present disclosure.

Referring FIG. 16, the memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control a read operation, a write operation, an erase operation, and a background operation of the memory device 2200. The memory controller 2100 may provide an interface between the memory device 2200 and the host. The memory controller 2100 may drive firmware for controlling the memory device 2200. The memory controller 2100 may be configured in the same manner as that of the memory controller 200 described with reference to FIG. 1.

In an embodiment, the memory controller 2100 may include components such as a random access memory (RAM), a processor, a host interface, and a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-e or PCIe), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and/or nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and/or a spin transfer torque magnetic RAM (STT-MRAM).

In an embodiment, the memory controller 2100 and the memory device 2200 may be integrated into a single semiconductor device to form a memory card, such as a personal computer memory card international association (PCM-CIA), a compact flash (CF) card, a smart media card (e.g., SM or SMC), a memory stick, a multimedia card (e.g., MMC, RS-MMC, or MMCmicro), a secure digital (SD) card (e.g., SD, miniSD, microSD, or SDHC), or a universal flash storage (UFS).

Figure 17:
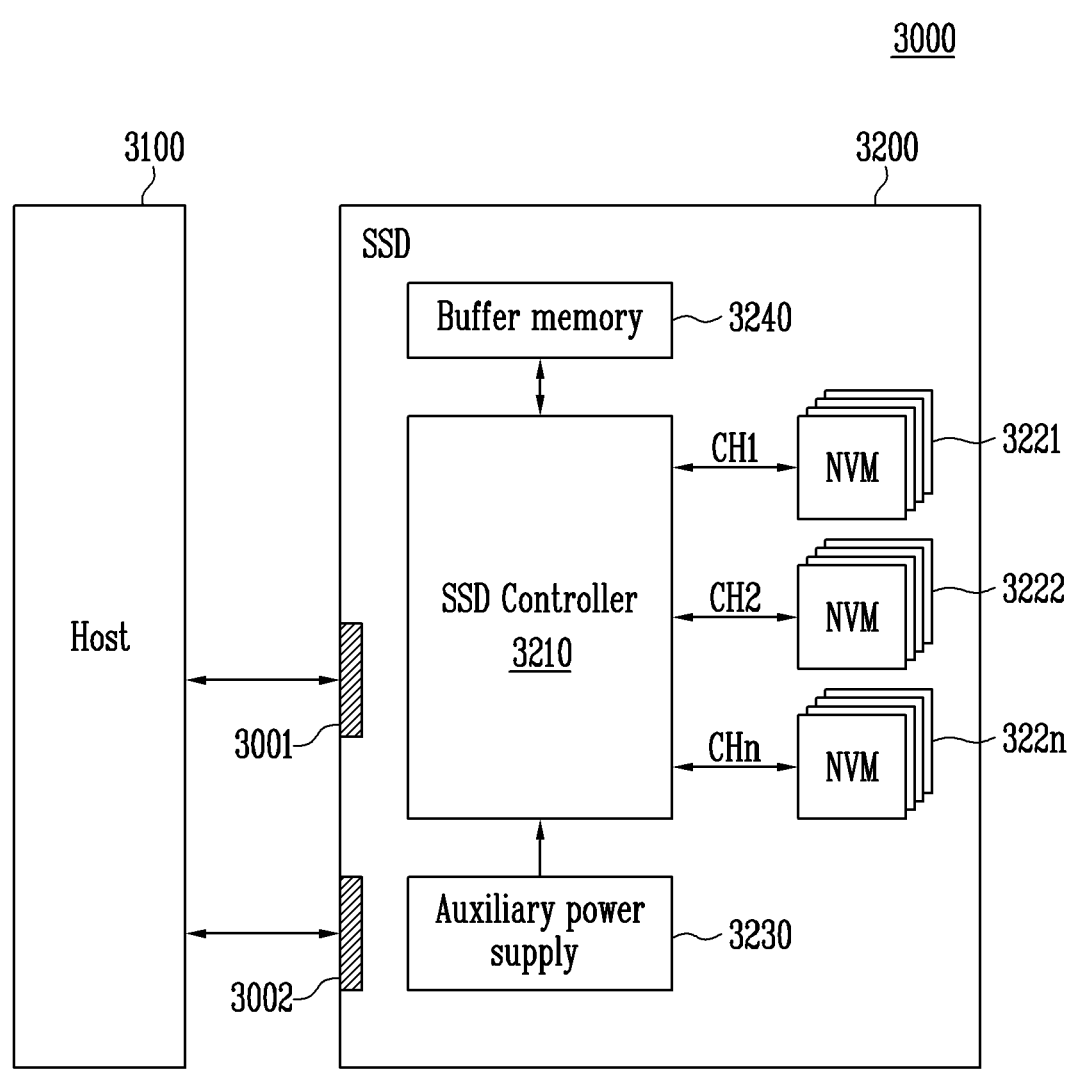
FIG. 17 is a block diagram illustrating a solid state drive (SSD) system to which the storage device is applied in accordance with an embodiment of the present disclosure.

FIG. 17 is a block diagram illustrating a solid state drive (SSD) system 3000 to which the storage device is applied in accordance with an embodiment of the present disclosure.

Referring to FIG. 17, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In an embodiment, the SSD controller 3210 may perform the function of the memory controller 200, described above with reference to FIG. 1.

The SSD controller 3210 may control the plurality of flash memories 3221 to 322n in response to the signals SIG received from the host 3100. In an embodiment, the signals SIG may be based on an interface between the host 3100 and the SSD 3200. For example, the signals SIG may be defined by at least one of various interfaces such as universal serial bus (USB), multimedia card (MMC), embedded MMC (eMMC), peripheral component interconnection (PCI), PCI-express (PCI-e or PCIe), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and/or nonvolatile memory express (NVMe) interfaces.

The auxiliary power supply 3230 may be coupled to the host 3100 through the power connector 3002. The auxiliary power supply 3230 may be supplied with power PWR from the host 3100, and may be charged by the power PWR. The auxiliary power supply 3230 may supply the power of the SSD 3200 when power from the host 3100 is not smoothly supplied. In an embodiment, the auxiliary power supply 3230 may be disposed within the SSD 3200 or externally to the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., a mapping table) of the flash memories 3221 to 322n. The buffer memory 3240 may include any of various volatile memories such as a DRAM, an SDRAM, a DDR SDRAM, an LPDDR SDRAM, and a GRAM or nonvolatile memories such as an FRAM, a ReRAM, an STT-MRAM, and/or a PRAM.

Figure 18:
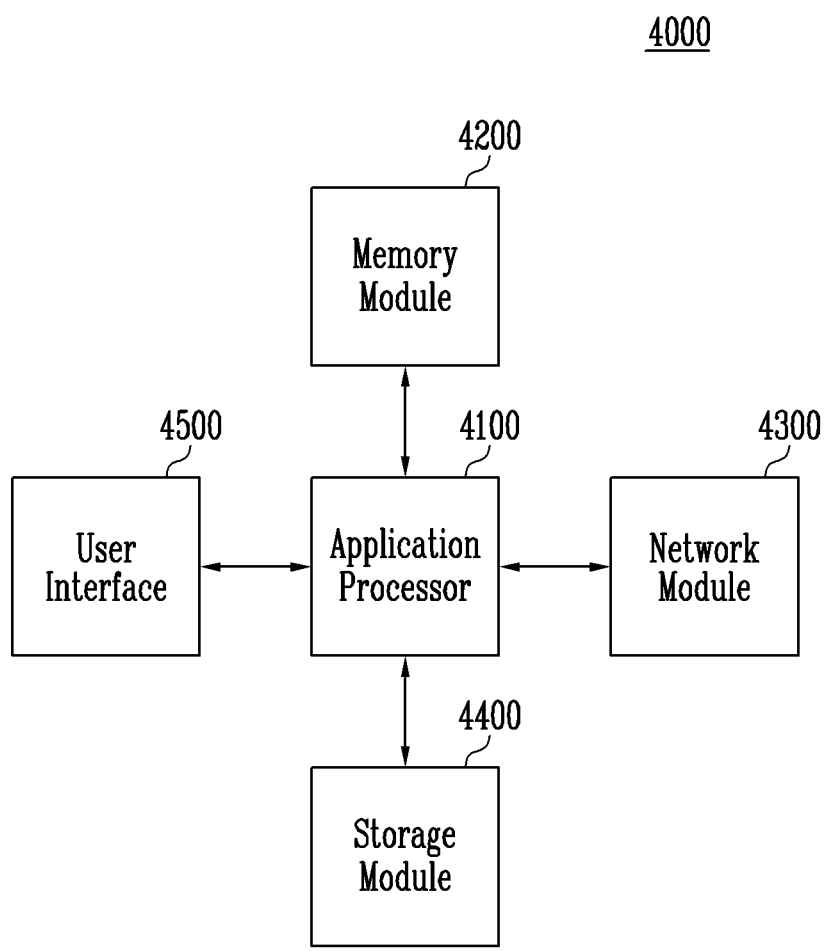
FIG. 18 is a block diagram illustrating a user system to which the storage device is applied in accordance with an embodiment of the present disclosure.

FIG. 18 is a block diagram illustrating a user system 4000 to which the storage device is applied in accordance with an embodiment of the present disclosure.

Referring to FIG. 18, the user system 4000 may include an application processor 4100, a memory module 4200, a network module 4300, a storage module 4400, and a user interface 4500.

The application processor 4100 may run components included in the user system 4000, an operating system (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory, or a cache memory of the user system 4000. The memory module 4200 may include a volatile RAM such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile RAM such as a PRAM, a ReRAM, an MRAM, and/or an FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as code division multiple access (CDMA), global system for mobile communication (GSM), wideband CDMA (WCDMA), CDMA-2000, time division multiple access (TDMA), long term evolution (LTE), WiMAX, WLAN, UWB, Bluetooth, or Wi-Fi communication. In an embodiment, the network module 4300 may be included in the application processor 4100.

The storage module 4400 may store data therein. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, each of which may be operated in the same manner as the memory device 100 described above with reference to FIG. 1. The storage module 4400 may be operated in the same manner as the storage device 50 described above with reference to FIG. 1.

The user interface 4500 may include interfaces for inputting data or instructions to the application processor 4100 or outputting data to an external device. In an embodiment, the user interface 4500 may include any of various user input interfaces such as a keyboard, a keypad, a button, a touch panel, a touch screen, a touch pad, a touch ball, a camera, a microphone, a gyroscope sensor, a vibration sensor, and/or a piezoelectric device. The user interface 4500 may further include any of various user output interfaces such as a liquid crystal display (LCD), an organic light emitting diode (OLED) display device, an active matrix OLED (AMO-LED) display device, an LED, a speaker, and/or a monitor.

As described above, various embodiments of the present disclosure may provide a memory system having improved map search performance, a memory controller, and a method of operating the memory controller.

Various embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A memory controller comprising:
a map buffer configured to store map segments loaded from a memory device;
a descriptor queue configured to store descriptors corresponding to the map segments, based on a plurality of addresses of the map buffer;
a write queue configured to store at least one of the descriptors and at least one of the plurality of addresses of the map buffer; and
a descriptor controller configured to search for a target descriptor among the stored descriptors based on a logical address received from a host, and reorder the stored descriptors while searching for the target descriptor,
wherein the descriptor controller:
reads a descriptor of a selected address among the plurality of addresses;
compares the descriptor of the selected address and a pop-up descriptor which is a descriptor of a previous address of the selected address;
stores the descriptor of the selected address and the previous address of the selected address in the write queue; and
updates the descriptor queue based on the descriptor and the previous address stored in the write queue,
wherein, as the target descriptor is repeatedly searched for among the stored descriptors based on the logical address received from the host, the stored descriptors in the descriptor queue are sequentially ordered, and
wherein, when the descriptor of the selected address differs from the target descriptor, the descriptor controller updates the descriptor queue based on descriptor information previously stored in the write queue, depending on a result of comparison between the descriptor of the selected address and the pop-up descriptor.

2. The memory controller according to claim 1, wherein the descriptor controller reads the descriptor of the selected address of the plurality of addresses, among the stored descriptors, and searches for the target descriptor, changing the selected address until the descriptor of the selected address matches the target descriptor.

3. The memory controller according to claim 2, wherein the descriptor controller determines a searching direction in which the target descriptor is searched for, based on a result of comparison between the target descriptor and a reference descriptor.

4. The memory controller according to claim 3, wherein, when the target descriptor is greater than the reference descriptor, the descriptor controller searches for the target descriptor in a direction in which the selected address decreases in the descriptor queue.

5. The memory controller according to claim 3, wherein, when the target descriptor is less than or equal to the reference descriptor, the descriptor controller searches for the target descriptor in a direction in which the selected address increases in the descriptor queue.

6. The memory controller according to claim 3, wherein the reference descriptor is determined to be an average value or a median value among descriptors corresponding to a plurality of map segments stored in the memory device.

7. The memory controller according to claim 1, wherein the descriptor controller reorders the stored descriptors in an ascending order based on the plurality of addresses.

8. The memory controller according to claim 1, wherein the descriptor controller reorders the stored descriptors in a descending order based on the plurality of addresses.

9. The memory controller according to claim 2, wherein the write queue is configured to store descriptor information for reordering the stored descriptors, and
wherein the descriptor controller is configured to set a minimum value or a maximum value of one or more descriptors read from the descriptor queue to the pop-up descriptor.

10. The memory controller according to claim 9, wherein, when the descriptor of the selected address differs from the target descriptor, the descriptor controller stores, in the write queue, the descriptor information including the descriptor of the selected address and the previous address of the selected address based on a result of comparison between the descriptor of the selected address and the pop-up descriptor, and updates the descriptor of the selected address in the descriptor queue to the pop-up descriptor.

11. A method of operating a memory controller, the method comprising:
- sequentially storing map segments loaded from a memory device in a map buffer;
- storing descriptors corresponding to the respective loaded map segments in a descriptor queue, based on a plurality of addresses of the map buffer;
- searching for a target descriptor among the stored descriptors based on a logical address received from a host;
- sequentially reading a descriptor of a selected address among the plurality of addresses of the map buffer;
- comparing a pop-up descriptor which is a descriptor of a previous address of the selected address;
- storing a descriptor which has to be reordered and the previous address of the selected address in a write queue; and
- updating the descriptor queue based on the write queue,
- wherein, as searching for the target descriptor among the stored descriptor based on the logical address received from the host is repeatedly performed, the stored descriptors in the descriptor queue are sequentially ordered, and
- wherein, when the descriptor of the selected address differs from the target descriptor, a descriptor controller updates the descriptor queue based on descriptor information previously stored in the write queue, depending on a result of comparison between the descriptor of the selected address and the pop-up descriptor.

12. The method according to claim 11, wherein searching for the target descriptor comprises reading the descriptor of the selected address of the plurality of addresses, among the stored descriptors, searching for the target descriptor, changing the selected address until the descriptor of the selected address matches the target descriptor.

13. The method according to claim 12, further comprising determining a searching direction in which the target descriptor is searched for, based on a result of comparison between the target descriptor and a reference descriptor.

14. The method according to claim 13, wherein determining the searching direction comprises determining the searching direction to be a direction in which the selected address of the plurality of addresses in the descriptor queue decreases, in response to a result in which the target descriptor is larger than the reference descriptor.

15. The method according to claim 13, wherein determining the searching direction comprises determining the searching direction to be a direction in which the selected address of the plurality of addresses in the descriptor queue increases, in response to a result in which the target descriptor is less than or equal to the reference descriptor.

16. The method according to claim 13, wherein the reference descriptor is determined to be an average value or a median value among descriptors corresponding to a plurality of map segments stored in the memory device.

17. The method according to claim 11, wherein reordering the descriptors comprises reordering the stored descriptors in an ascending order based on the plurality of addresses.

18. The method according to claim 11, wherein reordering the descriptors comprises reordering the stored descriptors in a descending order based on the plurality of addresses.

19. A memory system comprising:
- a memory device; and
- a controller including a map buffer, a descriptor queue and a write queue suitable for:
- loading a plurality of map segments in the map buffer;
- storing descriptors for the loaded map segments in the descriptor queue;
- storing a descriptor of a selected address among the plurality of addresses and a previous address of the selected address in the write queue;
- searching for a target descriptor for a logical address from a host, among the stored descriptors; and
- reordering the stored descriptors in the descriptor queue, based on the descriptor and the previous address stored in the write queue, to arrange the descriptors in a set order,
- wherein, as searching for the target descriptor for the logical address from the host, among the stored descriptors is repeatedly performed, the stored descriptors in the descriptor queue are sequentially ordered, and
- wherein, when the descriptor of the selected address differs from the target descriptor, a descriptor controller updates the descriptor queue based on descriptor information previously stored in the write queue, depending on a result of a comparison between the descriptor of the selected address and the descriptor of the previous address of the selected address.

* * * * *